United States Patent
Akedo et al.

(10) Patent No.: US 12,546,011 B2
(45) Date of Patent: Feb. 10, 2026

(54) CERAMIC COATING MEMBER

(71) Applicants: HOJITSU SEIKO CO., LTD., Gifu (JP); NATIONAL INSTITUTE OF ADVANCED INDUSTRIAL SCIENCE AND TECHNOLOGY, Tokyo (JP)

(72) Inventors: Jun Akedo, Tsukuba (JP); Isao Ohno, Gifu (JP)

(73) Assignees: HOJITSU SEIKO CO., LTD., Gifu (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 196 days.

(21) Appl. No.: 18/478,019

(22) Filed: Sep. 29, 2023

(65) Prior Publication Data
US 2024/0018663 A1     Jan. 18, 2024

Related U.S. Application Data

(63) Continuation of application No. PCT/JP2022/016953, filed on Mar. 31, 2022.

(30) Foreign Application Priority Data

Apr. 2, 2021 (JP) ................................ 2021-063817

(51) Int. Cl.
*C23C 24/04* (2006.01)
(52) U.S. Cl.
CPC .................... *C23C 24/04* (2013.01)

(58) Field of Classification Search
None
See application file for complete search history.

(56) References Cited

U.S. PATENT DOCUMENTS 6,280,802 B1    8/2001 Akedo et al.
2014/0349073 A1    11/2014 Sun et al.
(Continued)

FOREIGN PATENT DOCUMENTS

JP     2001247979 A    9/2001
JP     2001348658 A    12/2001
(Continued)

OTHER PUBLICATIONS

Seto et al. "Hard a-Al2O3 Film Coating on Industrial Roller Using Aerosol Deposition Method." Journal of Thermal Spray Technology. vol. 23(8). Dec. 2014: 1373-1381. Cited in Specification.
(Continued)

*Primary Examiner* — Ronak C Patel
(74) *Attorney, Agent, or Firm* — ROSSI, KIMMS & McDOWELL LLP

(57) ABSTRACT

A ceramic coating member with excellent rust prevention performance is provided. A ceramic coating member according to an embodiment of the present invention has a ceramic membrane arranged with ceramic fine particles on a metal substrate, wherein one-dimensional surface kurtosis (Rku) of the ceramic membrane is 3 or less, or two-dimensional surface kurtosis (Sku) is 3 or less, or $1<(Rkub \cdot Hyp)/Hys<6$, in the case where one-dimensional interface kurtosis of a convexoconcave formed at an interface of the ceramic membrane and the metal substrate is defined as Rkub, a hardness of the metal substrate is defined as Hvs, and a hardness of the ceramic particles is defined as Hvp.

4 Claims, 19 Drawing Sheets

(56) References Cited

U.S. PATENT DOCUMENTS

2019/0062923 A1* 2/2019 Tokuhashi .............. C23C 28/32
2020/0194334 A1   6/2020 Robinson et al.

FOREIGN PATENT DOCUMENTS

| JP | 3740523 | B2 | 2/2006 |
| JP | 2008111154 | A | 5/2008 |
| JP | 2009257568 | A | 11/2009 |
| JP | 2010285649 | A | 12/2010 |
| JP | 2014095148 | A | 5/2014 |
| WO | 2019043269 | A1 | 3/2019 |

OTHER PUBLICATIONS

International Search Report issued in Intl. Appln. No. PCT/JP2022/016953 mailed May 24, 2022. English translation provided.
Written Opinion issued in Intl. Appln. No. PCT/JP2022/016953 mailed May 24, 2022.
Extended European Search Report issued in European Appln. No. 22781322.7, mailed Aug. 28, 2024.
English translation of Written Opinion issued in Intl. Appln. No. PCT/JP2022/016953, mailed May 24, 2022, previously cited in IDS filed Sep. 29, 2023.

* cited by examiner 3 h 7 h 24 h 3 h 7 h

280

CERAMIC COATING MEMBER

CROSS-REFERENCE TO RELATED APPLICATIONS

This application is a Continuation of international Patent Application No. PCT/JP2022/016953, filed on Mar. 31, 2022, which claims the benefit of priority to Japanese Patent Application No. 2021-063817, filed on Apr. 2, 2021, the entire contents of which are incorporated herein by reference.

FIELD

The present invention relates to a ceramic coating member. In particular, the present invention relates to a ceramic coating member having rust prevention ability formed by an aerosol deposition method.

BACKGROUND

Conventionally, plating is generally used as a rust-preventive process for metal surfaces. Many types of plating, such as hard chromium plating, use 20 hexavalent chromium, and hexavalent chromium is subject to many regulations for its use as an environmentally hazardous substance. EU RoHS regulations (Restriction of Hazardous Substances) and ELV Directive (End-of-Life Vehicles Directive) prohibit the use of hexavalent chromium in household appliances and automotive components.

For this reason, trivalent chromium plating, high-speed flame spraying, plasma spraying, and the like have been studied as an alternative to plating using hexavalent chromium. In a plating technique using trivalent chromium plating, there is a problem that rust prevention ability is lowered as compared with the plating using hexavalent chromium, and there is a problem that the plating peels off because sufficient adhesion is not obtained because an interface with a metal substrate becomes porous. Therefore, the plating technique using trivalent chromium plating does not provide a significant merit in terms of the environment and economy. Further, although a coating membrane formed by a thermal spraying method is superior in hardness and corrosion resistance as compared with the plating, adhesion, abrasion resistance and membrane thickness control are inferior to the plating.

Currently, no alternative technology has been found that is equivalent in terms of function and economy to the plating using hexavalent chromium.

As a coating forming technique to replace the hexavalent chromium plating, it is desired to have applicability to large members having three-dimensional shapes, environmentally friendly dry coating (non-solution process), a coating forming technique having corrosion protection performance, excellent adhesion and the like while being a coating having a hardness of 900 HV or more and a membrane thickness of about several μm, and mechanical performance equivalent to or higher than that of hard chromium plating.

As a method for solving the above technical problem, there is known a technique for producing a dense ceramic coating such as an aerosol deposition method in which ceramic fine particles are carried in a solid state by a gas and sprayed onto a substrate, the ceramic fine particles are crushed and deformed to a nano-size, and a membrane is formed at room temperature (Japanese Laid-Open Patent Publication No. 2001-348658). In the aerosol deposition method, unlike the thermal spraying, since the ceramic fine particles sprayed on the substrate are not melted, cracks associated with solidification shrinkage do not occur, and while maintaining hardness and adhesion, formation of a ceramic membrane having high corrosion resistance and abrasion resistance on the metal substrate is expected. In addition, since the aerosol deposition method does not use any environmentally hazardous substances even in raw materials and manufacturing processes, it is not regulated unlike the plating process, and therefore, the aerosol deposition method has an advantage in that it does not require permission for an installation site of processing equipment. Furthermore, since the aerosol deposition method utilizes a fracture deformation phenomenon of the ceramic fine particles, it is characterized in that a membrane thinner than a particle diameter of the ceramic fine particles sprayed onto the substrate can be densely formed.

On the other hand, the aerosol deposition method is a method of forming a dense membrane by colliding and crushing ceramic fine particles with a substrate, crushing them into nano-sized fine crystal pieces, and a material flow and recombination of the crushed particles of fine crystals. Therefore, in the case where there is no sufficient material flow of the crushed particles, it is easy to form a gap in the bond between the crushed particles, and it was not easy to form a ceramic membrane without pinholes or cracks in an industrial level large area from a viewpoint of rust prevention and abrasion resistance.

For example, Japanese Laid-Open Patent Publication No. 2009-257568 examines a deposition technique using an aerosol deposition method from a viewpoint of abrasion resistance. In Japanese Laid-Open Patent Publication No. 2009-257568, a surface roughness (Ra) of the substrate on which a hard coating is to be formed is set to 0.15 μm or less, a membrane thickness of the hard coating is set to 1 μm or more and 5 μm or less, and the membrane thickness is set to ±2 μm or less based on a membrane thickness in an axial center of the hard coating, thereby reducing abrasion of a bearing.

In addition, it is disclosed in Japanese Laid-Open Patent Publication No. 2008-111154 that since the colliding fine particles on the substrate are subjected to stresses at small protrusions on the substrate surface by being 0.1 μm to 0.5 μm of an average particle size of the ceramic fine particles and 0.01 μm or more and 0.5 μm or less of the surface roughness Ra of the substrate surface, a shear stress due to shrinkage can be relaxed and the membrane can be grown while the membrane is being accumulated on the substrate surface, thereby improving a deposition rate.

SUMMARY

As a result of studies by the present inventors, in a deposition method disclosed in Patent Literatures 2 and 3, it has been found that it is difficult to form a ceramic membrane having no pinholes or cracks and excellent rust prevention performance and abrasion resistance in an industrial level large area of.

An object of an embodiment of the present invention is to solve the problem described above and to provide a ceramic coating member having excellent rust prevention performance.

A ceramic coating member according to an embodiment of the present invention has a ceramic membrane arranged with a plurality of ceramic fine particles on a metal substrate, wherein one-dimensional surface kurtosis (Rku) of the ceramic membrane is 3 or less, or two-dimensional surface kurtosis (Sku) is 3 or less, or $1<(Rkub \cdot Hyp)/Hys<6$, in the case where one-dimensional interface kurtosis of a convexoconcave formed at an interface of the ceramic membrane and the metal substrate is defined as Rkub, a hardness of the metal substrate is defined as Hvs, and a hardness of ceramic particles is defined as Hvp.

A thickness of the ceramic membrane may be 1 μm or more and 10 μm or less.

The plurality of ceramic fine particles may be fine particles in which a ceramic particle material is refined, and a relationship of $2.5<HvC/HvS<10$ may be provided between a Vickers hardness (HvC) of the ceramic particle material and a Vickers hardness (HvS) of the metal substrate.

The ceramic coating member may be an antirust coating member.

A manufacturing method of a ceramic coating member according to an embodiment of the prevent invention prepares ceramic particles having a hardness (Hvp) of the ceramic particle material satisfying the following formula, and a metal substrate having a hardness (Hvs) and one-dimensional surface kurtosis (Rkus) satisfying the following formula, jets the ceramic particles to the metal substrate, crushes the ceramic particles on a surface of the metal substrate, and binds the ceramic fine particles having a newly formed surface by crushing the ceramic particles via the newly formed surface, $$Rkub/Rkus = \alpha \cdot Hvs/Hvp \ (0.5<\alpha<3).$$

A surface of the prepared ceramic particles may be activated to generate an active area, the ceramic particles having the active area may be jetted to the metal substrate, the ceramic particles having the active area may be crushed on the surface of the metal substrate, and the ceramic fine particles having the active area and the newly formed surface may be bonded via the active area and the newly formed surface.

DESCRIPTION OF EMBODIMENTS

Figure 1A:
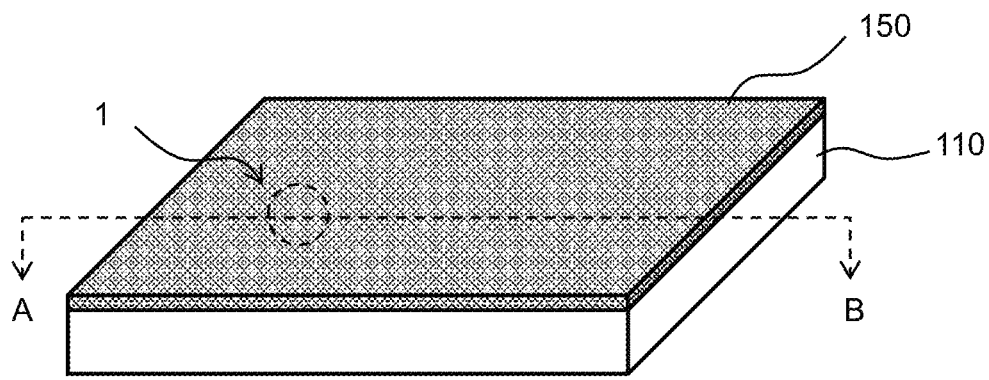
FIG. 1A is a schematic diagram showing a ceramic coating member 100 according to an embodiment of the present invention, which is a perspective view of the ceramic coating member 100 according to an embodiment.

Hereinafter, a ceramic coating member according to the present invention will be described with reference to the drawings. It should be noted that the ceramic coating member of the present invention is not to be construed as being limited to description contents of the following embodiments and examples. In the drawings referred to in the present embodiment and examples to be described later, the same parts or parts having the same functions are denoted by the same reference signs, and repeated description thereof will be omitted.

As a result of investigation by the present inventors, it was found that as a condition that the pinhole described above can be formed in a ceramic coating membrane, conditions under which ceramic particles colliding with a substrate, in particular, a metal substrate, are crushed into ceramic fine particles 151 which are uniform nanoscale fine crystal pieces are important from a deposition principle of an aerosol deposition method. By setting a surface roughness (convexoconcave shape) of the substrate, a membrane thickness of the ceramic coating membrane, and a hardness of the substrate in a predetermined relationship, the present inventors have found for the first time that an effect of suppressing a formation of pinholes and cracks in the ceramic coating membrane, that is, improving a rust preventive effect is provided. An embodiment of the present invention solves the problems described above, and provides a ceramic coating member in which a ceramic coating membrane without pinholes is formed on a surface of a metal substrate or the like at a low cost at a mass production level.

Figure 1B:
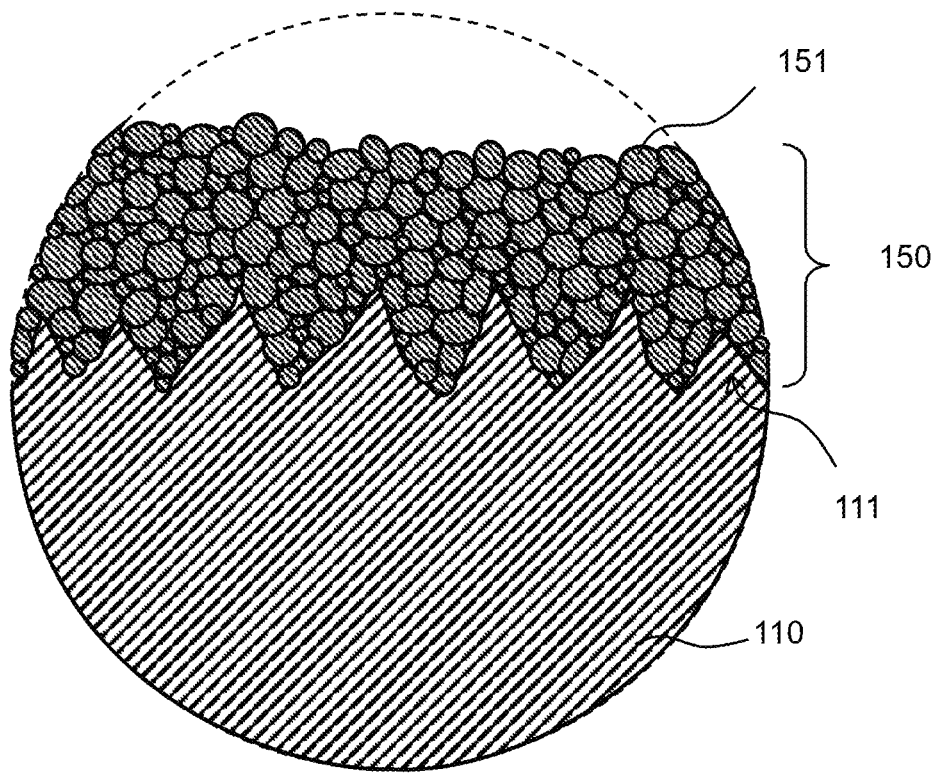
FIG. 1B is a cross-sectional view showing an interface between a metal substrate 110 and a ceramic membrane 150.

FIG. 1A and FIG. 1B are schematic diagrams showing a ceramic coating member 100 according to an embodiment of the present invention. FIG. 1A is a perspective view of the ceramic coating member 100 according to an embodiment, and FIG. 1B is a cross-sectional end view of a portion surrounded by a circle in FIG. 1A in a cross-sectional plane in which the ceramic coating member 100 is cut in a line segment AB of FIG. 1A. FIG. 1B is a schematic diagram showing an interface between a metal substrate 110 and a ceramic membrane 150. The ceramic coating member 100 has the ceramic membrane 150 in which a plurality of ceramic fine particles 151 are disposed on the metal substrate 110. The metal substrate 110 has fine convexoconcaves 111 at least at the interface with the ceramic membrane 150.

In an embodiment, the ceramic coating member 100 satisfies a relationship of $1<(\text{Rkub} \cdot \text{Hvp})/\text{Hvs}<6)$ in the case where a one-dimensional interface kurtosis of the convexoconcave 111 formed at the interface between the ceramic membrane 150 and the metal substrate 110 is Rkub, a hardness of the metal substrate is Hvs, and a hardness of the ceramic particle is Hvp.

On the other hand, a shape of the convexoconcave 111 formed at the interface between the ceramic membrane 150 and the metal substrate 110 also affects a surface shape of the ceramic membrane 150. Therefore, in an embodiment, in the ceramic coating member 100, a one-dimensional surface kurtosis (Rku) of the surface of the ceramic membrane 150 may be 3 or less.

Alternatively, in an embodiment, a two-dimensional surface kurtosis (Sku) may be 2 or less in the ceramic coating member 100.

[Definition of Kurtosis]

Kurtosis is described herein. The one-dimensional surface kurtosis (Rku) refers to a kurtosis which is a measure of a surface sharpness of the ceramic membrane 150, and represents a kurtosis (sharpness) of a height distribution. The one-dimensional surface kurtosis (Rku) is a parameter representing a fourth power mean of a height Z(x) of a roughness curve in a reference length made dimensionless by the fourth power of a root mean square height (Rq) regarding the convexoconcave of a surface of the ceramic membrane 150. In addition, a one-dimensional interface kurtosis (Rkub) is a parameter representing a fourth power mean of a height Z(x) of a roughness curve in a reference length made dimensionless by the fourth power of the root mean square height (Rq) regarding the convexoconcave 111 formed at the interface between the ceramic membrane 150 and the metal substrate 110. The kurtosis (Rku) is represented by the following formulas. In the following formula (1), L represents a reference length.

[Mathematical Formula 1]

$$Rku = \frac{1}{Rq^4}\left[\frac{1}{L}\right]\int_0^L Z^4(x)dx \quad (1)$$

Rku=3: Normal distribution

Rku>3: The height distribution of the surface convexoconcave is sharp

Rku<3: The height distribution of the surface convexoconcave has a collapsed shape In addition, the two-dimensional surface kurtosis (Sku) indicates a kurtosis obtained by three-dimensionally expanding the one-dimensional surface kurtosis (Rku), which is a two-dimensional parameter, as shown in the following formula (2).

[Mathematical Formula 2]

$$Sku = \frac{1}{Rq^4}\left[\frac{1}{s}\right]\int_0^{L1}\int_0^{L2} Z^4(x)dx \qquad (2)$$

S=L1×L2: Reference area
Sku=3: Normal distribution
Sku>3: The height distribution of the surface convexoconcave is sharp
Sku<3: In this case, the height distribution of the surface convexoconcave has a collapsed shape In the above formula (2), the vertical length L1 and the horizontal length L2 constituting the reference area S may be the same or may be different. Further, the reference area S is not limited to an area of a rectangle, and may be, for example, an area of a circle.

[Definition of Plateau Structure Surface Parameters]

It is possible to obtain a material ratio curve in which a ratio of an actual part appearing when cut at a certain height c is expressed as a function of c in a contour curve of the convexoconcave 111. It is possible to obtain a core roughness depth (Rk) in a core portion, a material ratio (Mr1) of a core portion on a reduced peak height side, and a material ratio (Mr2) of a core portion on a reduced valley depth side from a linear curve (equivalent linear curve) minimizing the sectional inclination corresponding to 40% of the material ratio curve. Considering a triangle with the area equivalent to the protrusion of the material ratio curve segmented by the breadth of Rk, and a protruding reduced peak height (Rpk) and a reduced protruding valley height depth (Rvk) are calculated from this triangle.

[Membrane Thickness of Ceramic Membrane]

In an embodiment, the thickness of the ceramic membrane 150 is 1 µm or more and 10 µm or less. Regarding a thickness of a ceramic membrane in which the rust preventive effect is obtained, in the case where ceramic particles used as a raw material of the ceramic fine particles 151 are not sufficiently crushed by the convexoconcave 111 of the surface of the metal substrate 110, sufficient rust preventive force cannot be obtained because a gap penetrating from the surface of the ceramic membrane 150 to the surface of the metal substrate 110 is formed between the crushed ceramic fine particles 151 constituting the ceramic membrane 150. In addition, if the ceramic membrane 150 is too thick, a compressive stress in the membrane increases, and if the compressive stress in the membrane exceeds an adhesion force of the crushed ceramic fine particles 151 to the metal substrate 110, fine peeling or cracking occurs in the ceramic membrane 150, and pinholes are generated.

As shown in the Example to be described later, if a Rku value is Rku<3, or a Rpk value is Rpk<0.5, and a thickness (t) of the ceramic membrane 150 is 1 µm<t<10 µm, it is possible to form a pinhole-free ceramic membrane 150 that has high mass productivity and can withstand practical use, and a sufficient rust prevention effect is obtained. In particular, focusing on the Rpk value, the Rpk value is more than 10 times in a portion where rust frequently appears, compared to a portion where rust does not appear.

Further, in the ceramic coating member 100, the ceramic fine particles 151 are fine particles obtained by refining the ceramic particles used as the raw material, and have the relationship of 2.5<HvC/HvS<10 between the Vickers hardness of the ceramic particle material (HvC) and the Vickers hardness of the metal substrate (HvS).

Figure 2A:
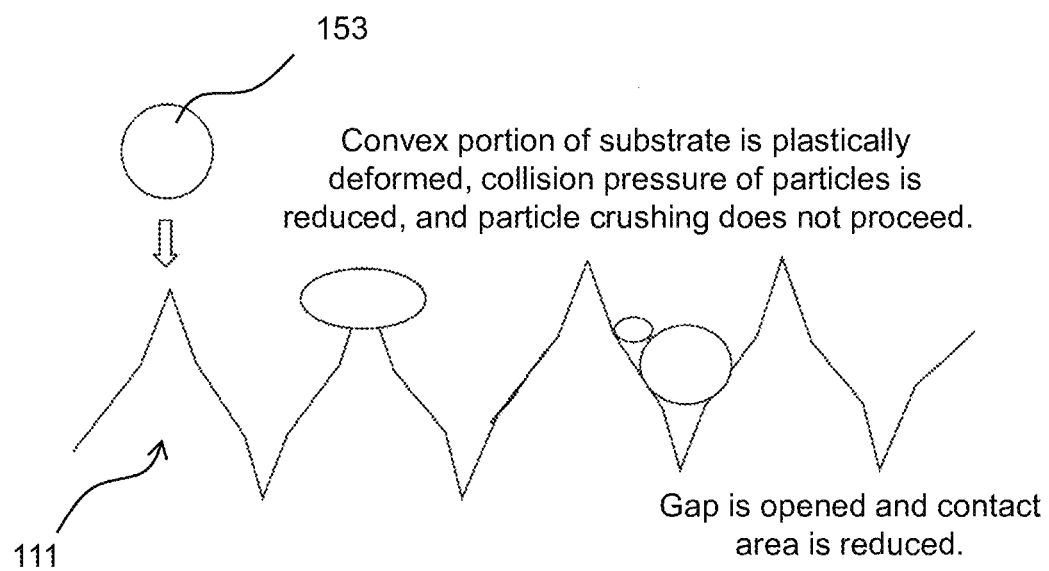
FIG. 2A is a schematic diagram for explaining the case where a size of ceramic particles used as a raw material (D) and a period of a convexoconcave 111 (dr) is close ($0.5<D/dr<1.5$).

FIG. 2A is a schematic diagram for explaining the case where a size (D) of ceramic particles used as raw material and a period (dr) of a convexoconcave 111 is close (0.5<D/dr<1.5). When a hardness of the ceramic particles 153 used as the raw material is higher than a hardness of the metal substrate 110 and the ceramic particles 153 collide with a pointed convex (crest) portion of the surface of the metal substrate 110, the convex portion is largely plastically deformed. A compressive reaction force applied to the ceramic particles is relaxed due to this deformation, and sufficiently homogeneous particle crushing does not proceed. In the aerosol deposition method, the ceramic particles 153 used as the raw material need to collide with the metal substrate 110 to crush the ceramic particles 153 into ceramic fine particles 151 which are uniform nanoscale fine crystal pieces, and an active newly formed surface needs to be formed on the surface of the ceramic fine particles 151. Since bonding between the surface of the ceramic fine particles 151 and the surface of the metal substrate 110 and bonding between the ceramic fine particles 151 on the surface are caused due to a bonding force generated on the newly formed surface to form the ceramic membrane 150, the crushing of the ceramic particles is one of the important processes in the aerosol deposition method.

Further, although the ceramic particles 153 are crushed when the ceramic particles 153 collide with a sharply recessed recess (valley) portion of the metal substrate 110, since a gap is generated between the ceramic particles 153 and the valley portion of the recess of the metal substrate 110, and a bonding area of the crushed ceramic fine particles 151 and the metal substrate 110 is reduced, the ceramic fine particles 151 do not sufficiently adhere to the metal substrate 110. As a result, the dense ceramic membrane 150 uniformly adhered to the metal substrate 110 cannot be formed, and in the case where the ceramic membrane 150 has a thin membrane thickness, pinholes are easily formed. In particular, as the membrane thickness of the ceramic membrane 150 increases, the stress inside the membrane also increases. As a result, if a portion which is not in close contact at the interface between the metal substrate 110 and the ceramic membrane 150 is partially present, a partial peeling of the ceramic membrane 150 and a crack in the ceramic membrane 150 occur from there as a starting point, and the rust preventive effect decreases conversely. Therefore, if there is a portion where the adhesion between the metal substrate 110 and the ceramic membrane 150 is insufficient, it is difficult to form the ceramic membrane 150 having high mechanical strength and high electrical insulating properties at the same time as the rust preventive effect.

Figure 2B:
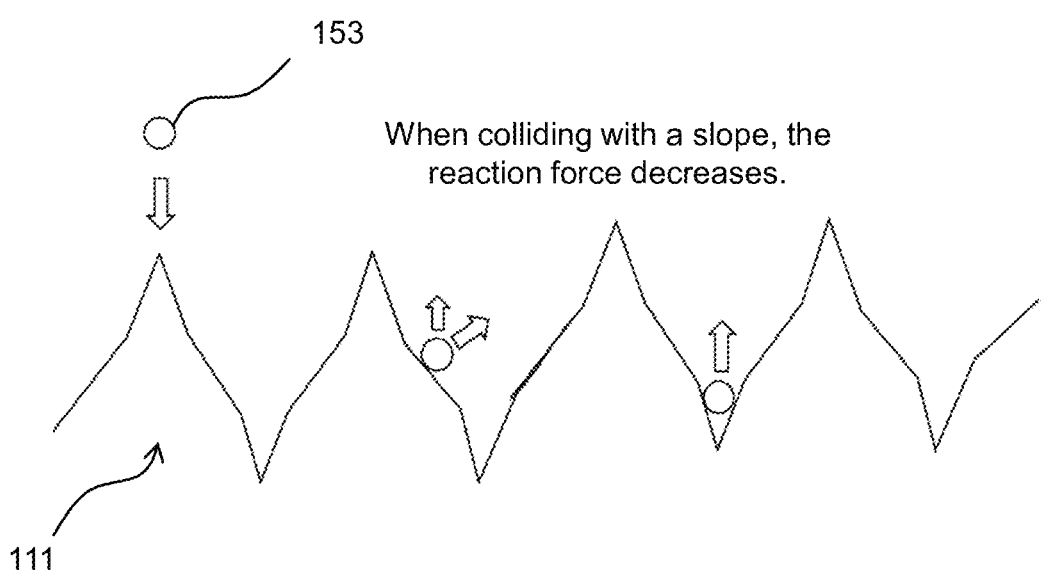
FIG. 2B is a schematic diagram for explaining the case where the size of the ceramic particles used as the raw material is sufficiently small with respect to the period of the convexoconcave 111 ($D/dr<0.5$).

FIG. 2B is a schematic diagram for explaining the case where the size of the ceramic particles used as the raw material is sufficiently small with respect to the period of the convexoconcave 111 (D/dr<0.5). Since the particles collide obliquely to an inclined surface of the convexoconcave 111 in the case where the particles collide with an apex of the convexoconcave 111 or a vicinity of the apex, a compressive stress of the ceramic particles 153 due to the collision is reduced as compared with the case where the ceramic particles 153 collide perpendicularly to the surface of the metal substrate 110, and the ceramic particles 153 are less likely to be crushed. For this reason, it becomes difficult to obtain dense inter-particle bonding or inter-particle bonding with strong bonding strength. As a result, pores and cracks are likely to be formed in the ceramic membrane 150 formed on the substrate surface, and the rust preventive effect is lowered. Further, an effect that the ceramic particles 153 collide with the peak portion of the convexoconcave 111 and the particle crushing becomes insufficient and uneven is considered to be larger compared to an effect that the ceramic fine particles 151 are not in close contact with the deep valleys of the convexoconcave 111.

Further, since a convexoconcave that satisfies the conditions described above and is disposed at the interface between the metal substrate 110 and the ceramic membrane 150 is deformed by colliding ceramic particles harder than the metal substrate 110, depending on the hardness of the metal substrate 110, the one-dimensional interface kurtosis (Rkub) of the convexoconcave (anchoring layer) 111 of the interface formed during the deposition becomes smaller than the one-dimensional surface kurtosis (Rkus) of the metal substrate 110 prior to the deposition. Therefore, the hardness (Hvp) of the ceramic particle material and the hardness (Hvs) of the metal substrate 110 satisfy the following relationship:

$$Rkub/Rkus = \alpha \cdot Hvs/Hvp \ (0.5 < \alpha < 3).$$

[Metal Substrate]

In the present embodiment, although a material of the metal substrate 110 is not particularly limited as long as the above relational formula is satisfied, for example, iron, copper, nickel, or an alloy containing iron can be used. For example, carbon-steel (S45C, SD295A, SWRM, STKM11A, STKM13A, STK400) compliant with the Japanese Industrial Standard (JIS) can be used. Further, specialty steel (DC53) compliant with JIS can be used. Further, chromium-molybdenum-steel (SCM435, SCM440, SCM415, SNCM439, SNCM420) compliant with JIS can be used. Further, tool steel and dice copper (SUJ2, SKS3, SKD11, SKH51, SKS93) compliant with JIS can be used. Further, brass (C2700, C3604, C4641, C6782) compliant with JIS can be used. Further, copper (ABB2, PBC2, BC6, BECU25, BECU50, C1020, C1100, C1220, C5191, CRCUP) compliant with JIS can be used. Further, prehardened steel (NAK55, NAK80) compliant with JIS can be used. Further, stainless steel (SUS3003, SUS304, SUS310S, SUS316, SUS403, SUS420J2, SUS440C, SUS630) compliant with JIS can be used. Further, an aluminum alloy (A1050, A1070, A2014, A2017, A2024, A5052, A5056, A5083, A6061, A6063) compliant with JIS can be used. In addition, the material of the metal substrate 110 is not limited to these materials.

Further, in an embodiment, the surface of the metal substrate 110 forming the ceramic membrane 150 is cut, ground, or polished so as to satisfy the above relational formula, so that the rust preventive effect can be obtained at a mass production level.

Further, as a method for polishing and grinding the substrate in this case, it is also possible to grind or polish a surface of a metal substrate 110 to adjust a Rku value and a Sku value to 3 or less by spraying ceramic particles for polishing and grinding from a nozzle to the metal substrate 110 obliquely by using the aerosol deposition method shown in the ultrafine particle material flattening deposition method described in U.S. Pat. No. 3,740,523, and then spraying the ceramic particles for deposition to the substrate to form a ceramic membrane. Alternatively, the Rku value and the Sku value of the metal substrate 110 may be adjusted to 3 or less by grinding or polishing the surface of the metal substrate 110 by blowing the ceramic particles for polishing and grinding in a fan shape from the nozzle.

[Ceramic Particles]

In the present embodiment, although the ceramic particles 153 serving as a raw material for forming the ceramic membrane 150 are not particularly limited as long as they satisfy the above relational formulas, for example, alumina ($Al_2O_3$) or silica ($SiO_2$), zirconia ($ZrO_2$), partially stabilized zirconia (YSZ), yttria ($Y_2O_3$), silicon nitride ($Si_3N_4$), aluminum nitride (AlN), tungsten carbide (WC), SiAlON ($Si_3N_4$—$Al_2O_3$), cermet (TiC-20TiN-15WC-10Mo$_2$C-5N), or the like can be used. In an embodiment, the ceramic particles 153 are preferably alumina having a mean particle size of 50 nm to 10 μm.

[Manufacturing Method of Ceramic Coating Member]

The ceramic coating member 100 according to the present invention can be manufactured using the aerosol deposition method. The aerosol deposition method can be performed, for example, in accordance with the description of Japanese Laid-Open Patent Publication No. 2001-348658 or N. Seto et al., Journal of Thermal Spray Technology, Volume 23 (8) December 2014, P1373-1381. In N. Seto et al., Journal of Thermal Spray Technology, Volume 23 (8) December 2014, P1373-1381, a ceramic membrane is formed by the aerosol deposition method in consideration of only a surface roughness (Ra) of a metallic roller. On the other hand, the present application has realized an industrially effective rust preventive effect in a ceramic coating member by focusing on surface kurtosis.

Figure 3:
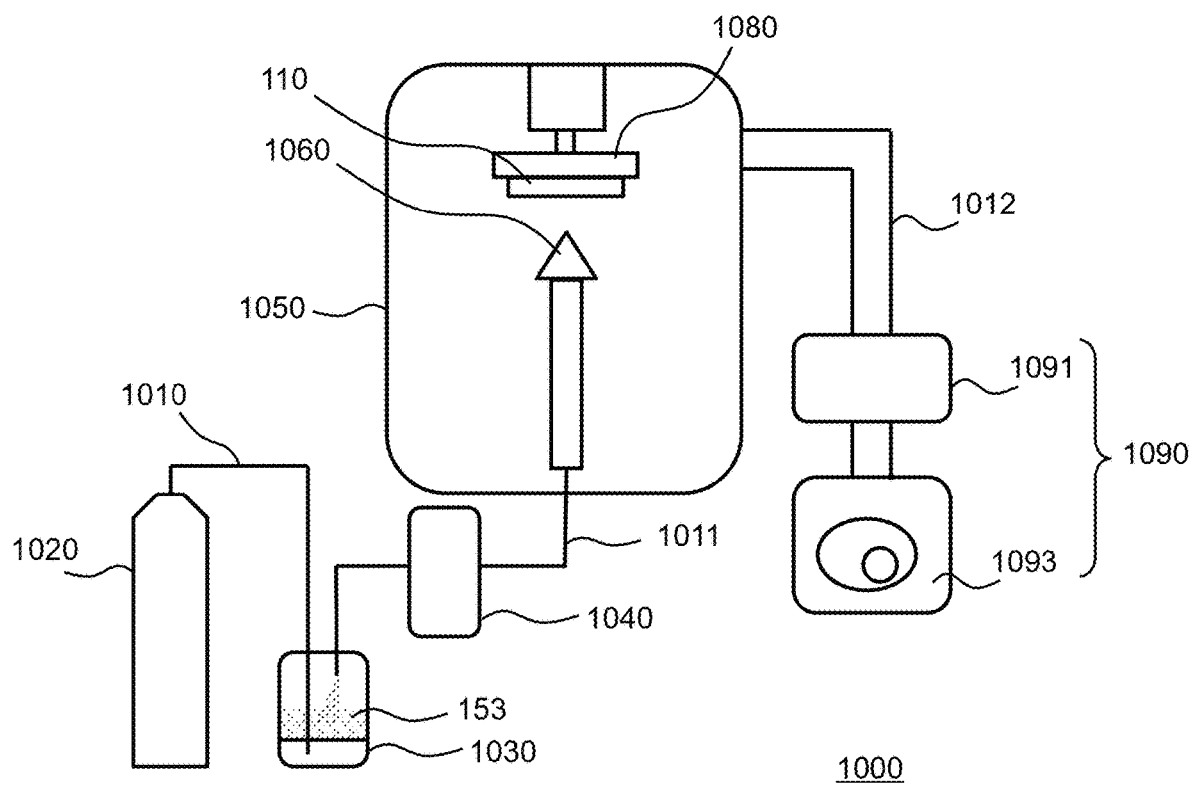
FIG. 3 is a schematic diagram showing a manufacturing equipment 1000 used for manufacturing the ceramic coating member 100 according to an embodiment of the present invention.

FIG. 3 is a schematic diagram showing manufacturing equipment 1000 used for manufacturing the ceramic coating member 100 according to an embodiment of the present invention. The manufacturing equipment 1000 includes, for example, an aerosolization chamber 1030 and a deposition chamber 1050. In the manufacturing equipment 1000, a carrier gas cylinder 1020 is connected to the aerosolization chamber 1030 via a carrier pipe 1010. The carrier gas cylinder 1020 contains an inert gas such as argon or helium, for example. The aerosolization chamber 1030 contains ceramic particles 153 that serve as a raw material for the ceramic membrane 150. Carrier gas supplied from the carrier gas cylinder 1020 is mixed with and agitated with the ceramic particles 153 to be aerosolized.

The aerosolized ceramic particles 153 are filtered through a classifier 1035 via a carrier pipe 1011, and then carried to the deposition chamber 1050 and sprayed onto the surface of the metal substrate 110 from a deposition nozzle 1060. The ceramic particles 153 sprayed onto the surface of the metal substrate 110 collide on the surface of the metal substrate 110 and are pulverized into the ceramic fine particles 151, which are fine nanoscale homogeneous crystal pieces, and are deposited on the surface of the metal substrate 110 to form the ceramic membrane 150. An active newly formed surface is formed on the surface of the ceramic fine particles 151, bonding between the surface of the ceramic fine particles 151 and the surface of the metal substrate 110, and bonding between the surfaces of the ceramic fine particles 151 occur. The surface of the ceramic fine particles 151 and the surface of the metal substrate 110 are bonded to each other and the ceramic fine particles 151 are bonded to each other through the newly formed surface of the ceramic fine particles 151 generated by the collision crushing of the metal substrate 110. As a result, the ceramic fine particles 151 are deposited on the surface of the metal substrate 110, and the ceramic membrane 150 is formed. In this way, it is possible to manufacture the ceramic coating member 100 having excellent rust prevention performance in which generation of pinholes is suppressed.

In the deposition chamber 1050, X-Y-Z stages 1080 are disposed at positions facing the deposition nozzles 1060. The metal substrate 110 is disposed on the X-Y-Z stage 1080, and the ceramic fine particles 151 can be deposited at a desired position on the surface of the metal substrate 110 by driving the X-Y-Z stage 1080 to form the ceramic membrane 150. A vacuum pumping system 1090 for reducing pressure and degassing an inside of the deposition chamber 1050 is connected to the deposition chamber 1050 via a carrier pipe 1012. The vacuum pumping system 1090 may include, for example, a mechanical booster pump 1091 and a rotary pump 1093.

An aerosol of the ceramic particles 153 sent to the deposition chamber 1050 in which the pressure is reduced is sprayed onto the metal substrate 110 from the deposition nozzle 1060 with a thin opening to form the ceramic membrane 150. In this case, if the inside of the deposition chamber 1050 is at a pressure of 0.1 Torr or more and 10 Torr or less, the carried ceramic particles 153 are easily accelerated up to several hundred m/sec. Velocity of the aerosol sprayed onto the metal substrate 110 is preferably 150 m/sec or more and 400 m/sec or less. The ceramic membrane 150 in which ceramic particles 153 are deposited and solidified at room temperature is formed by an adjustment of the ceramic particles 153 to be used, a particle size distribution of the ceramic particles 153, acceleration conditions, and a deposition atmosphere, and the like.

Figure 4:
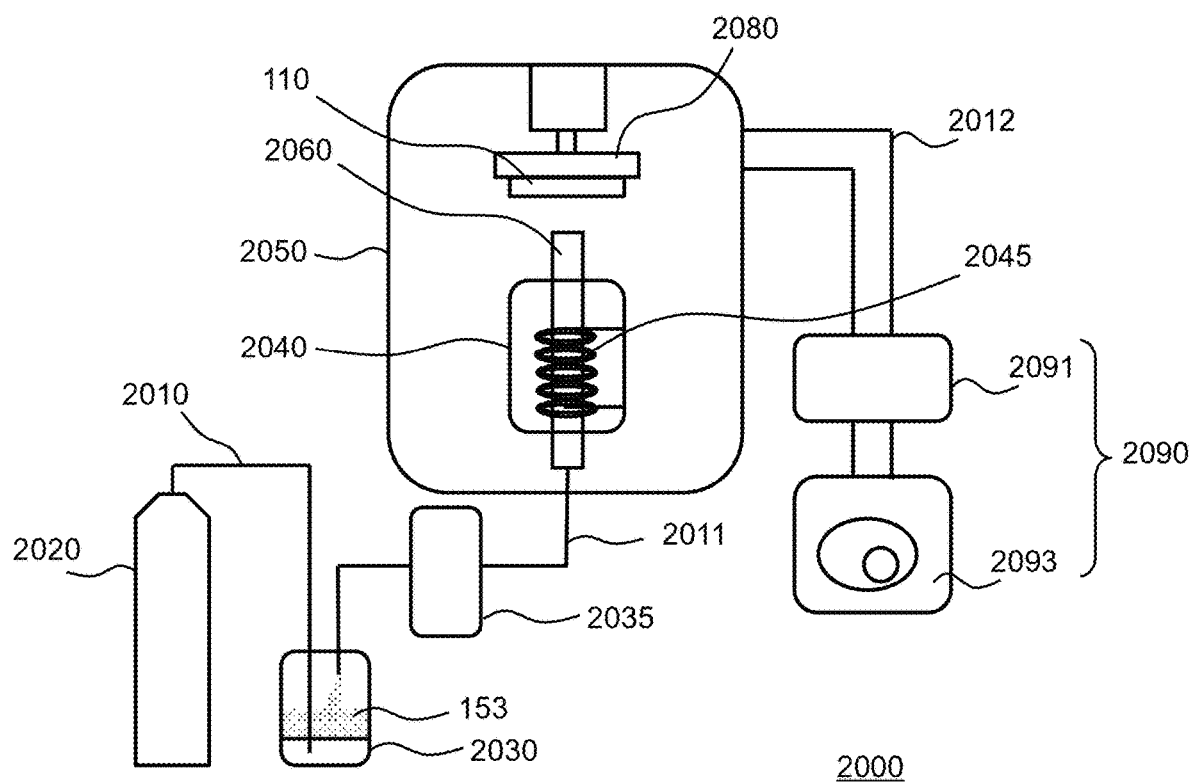
FIG. 4 is a diagram showing a manufacturing equipment 2000 used for manufacturing the ceramic coating member 100 according to an embodiment of the present invention.

FIG. 4 is a schematic diagram showing manufacturing equipment 2000 used for manufacturing the ceramic coating member 100 according to an embodiment of the present invention. The manufacturing equipment 2000 includes, for example, an aerosolization chamber 2030, a plasma generator 2040, and a deposition chamber 2050. In the manufacturing equipment 2000, a carrier gas cylinder 2020 is connected to the aerosolization chamber 2030 via a carrier pipe 2010. A configuration of the carrier gas cylinder 2020 and the aerosolization chamber 2030 may be the same as those of the carrier gas cylinder 1020 and the aerosolization chamber 1030, and a detailed description thereof will be omitted.

The aerosolized ceramic particles 153 are carried to the plasma generator 2040 via a carrier pipe 2011. As the plasma generator 2040, for example, an induction coil can be used. A surface of the ceramic particles 153 is electronically excited in a temperature range below a melting point of the ceramic particles 153 by non-thermal equilibrium plasma generated in the plasma generator 2040, and an active area is continuously generated in an outermost surface layer of the ceramic particles 153.

The surface-activated ceramic particles 153 are carried to the deposition chamber 2050 and sprayed onto the surface of the metal substrate 110 from a deposition nozzle 2060. The ceramic particles 153 sprayed onto the surface of the metal substrate 110 collide on the surface of the metal substrate 110 and are pulverized into ceramic fine particles 151, which are fine homogeneous nanoscale crystal pieces, and are deposited on the surface of the metal substrate 110 to form the ceramic membrane 150. An active newly formed surface is formed on the surface of the ceramic fine particles 151, bonding between the surface of the ceramic fine particles 151 and the surface of the metal substrate 110, and bonding between the surfaces of the ceramic fine particles 151 occur. Although plasma used to generate an active area of the surface layer of the ceramic fine particles 151 has a plasma frame in which the ceramic fine particles 151 reach the metal substrate 110, thermal damage to the metal substrate 110 is preferably not provided. The active area of the surface layer of the ceramic particles generated by the plasma is maintained until the ceramic particles fly through the plasma frame and reach the metal substrate 110, and the surface of the ceramic fine particles 151 and the surface of the metal substrate 110 are bonded to each other, and the ceramic fine particles 151 are bonded to each other through the active area generated by the plasma and the newly formed surface of the ceramic fine particles 151 generated by collision crushing with the metal substrate 110. As a result, the ceramic fine particles 151 are deposited on the surface of the metal substrate 110, and the ceramic membrane 150 is formed. In this way, it is possible to manufacture the ceramic coating member 100 having an excellent rust prevention performance in which generation of pinholes is suppressed.

In the deposition chamber 2050, an X-Y-Z stage 2080 is disposed at a position facing the deposition nozzles 2060. The metal substrate 110 is disposed on the X-Y-Z stage 2080, and by driving the X-Y-Z stage 2080, the ceramic fine particles 151 can be deposited at a desired position on the surface of the metal substrate 110 to form the ceramic membrane 150. The deposition chamber 2050 is connected to a vacuum pumping system 2090 for reducing pressure and degassing an inside of the deposition chamber 2050 via a carrier pipe 2012. The vacuum pumping system 2090 may include, for example, a mechanical booster pump 2091 and a rotary pump 2093.

The ceramic particles 153 mixed with the carrier gas in the aerosolization chamber 2030 are passed through a classifier 2035 to filter coarse particles, and then are sent to the reduced-pressure deposition chamber 2050 to form the ceramic membrane 150 by being sprayed onto the metal substrate 110 as an aerosol of the ceramic particles 153 from the deposition nozzle 2060 with a thin-opening. In this case, if the inside of the deposition chamber 2050 is at a pressure of 0.1 Torr or more and 100 Torr or less, the carried ceramic particles 153 are easily accelerated up to several hundred m/sec. The velocity of the aerosol sprayed onto the metal substrate 110 is preferably 150 m/sec or more and 400 m/sec or less. The ceramic membrane 150 in which ceramic particles 153 are deposited and solidified at room temperature is formed by an adjustment of the ceramic particles 153 to be used, a particle size distribution of the ceramic particles 153, the acceleration conditions, and a deposition atmosphere, and the like.

Ceramic particles and the metal substrate 110 in which the hardness (Hvp) of the ceramic particle and the hardness (Hvs) of the metal substrate 110 satisfy the following relationship are prepared. In an embodiment, ceramic particles that satisfy the following relationship can be selected depending on the substrate used:

$$Rkub/Rkus = \alpha \cdot Hvs/Hvp \ (0.5 < \alpha < 3).$$

Further, in an embodiment, the rust preventive effect is obtained at a mass production level by cutting or grinding, and polishing the surface of the metal substrate 110 forming the ceramic membrane 150 so as to satisfy the above relational formula. In this case, the ceramic particles 153 as a raw material are preferably alumina having a mean particle diameter of 50 nm to 10 μm.

EXAMPLES

Hereinafter, although the present invention will be described in detail based on Examples, the present invention is not limited to these Examples.

In the following Examples, reference lengths (L) of the Rku values and the Rpk values were 100 μm or more and 20 mm or less, and a reference area (S) at the Sku value was 100 μm square or more and 20 mm square or less.

Example 1

Iron base metal substrates (SS400, Vickers hardness: 200 Hv to 400 Hv) with a surface roughness (Ra) of 2 μm to 3 μm and α-alumina (Vickers hardness: 1000 Hv to 2000 Hv) with a particle-size distribution of 0.08 μm to 10 μm were prepared. The surface roughness of the metal substrate was changed by changing a relative speed of a cutter and a workpiece by using the fact that a peripheral speed of the workpiece increases from a rotation center toward an outer peripheral portion by processing the metal substrate by a lathe. A ceramic membrane was formed on the metal substrate by the aerosol deposition method or a plasma-assisted aerosol deposition method using the prepared metal substrate and α-alumina particles. A ceramic coating member having a ceramic membrane with a membrane thickness of about 1 to 10 μm was formed by setting a vacuum degree: 100 Pa to 500 Pa, carrier gas: air, and carrier gas flow rate: 2 L/min to 40 L/min as deposition conditions.

An evaluation of rust prevention of ceramic coating members was carried out in accordance with a salt spray test (JIS Z 2371: 2015) which is widely used as an evaluation method in surface treatment such as coating and plating. Specifically, it is as follows.

Outline of the JIS Z 2371 salt spray test
<Device>

A spray chamber equipped with a spray tower or a spray nozzle, a salt solution storage tank, a test piece holder, a spray collection container, and the like, a salt solution replenishment tank, a compressed air supplier, an air saturator, a temperature control device, an exhaust duct, and the like.

<Test Conditions>
Salt solutions 50 g/L±5 g/L, pH 6.5 to 7.2 (25° C.±2° C.)
Test equipment internal temperature: 35° C.±2° C.
Spray device: 98 kPa±10 kPa
Spray amount: spray 1.5±0.5 ml/hr. for 80 cm².
Spray collection container (funnel-like): Diameter 100 mm, area about 80 cm², installed in two or more places (near and far from the sprayer).
Air without oil and dust: was 0.098±0.010 MPa.

To prevent evaporation of water from the spray solution, compressed air sent to the spray tower or the deposition nozzle was passed through a humidifier or an air saturator.

In a test elapsed time, the presence or absence and a size of rust on the surface of the ceramic membrane of the ceramic coating member, and the degree of progress of surface corrosion due to rust were confirmed by visual observation, or by an optical microscope or an electron microscope.

The surface roughness was measured and calculated using a confocal microscope (Lasertec Corporation, OPTELICS® HYBRID+) in accordance with methods for evaluating the surface roughness (JIS B 0601: 1994). As a measurement surface, the surface of the metal substrate before the deposition and the surface of the ceramic membrane after the deposition were used.

Figure 5:
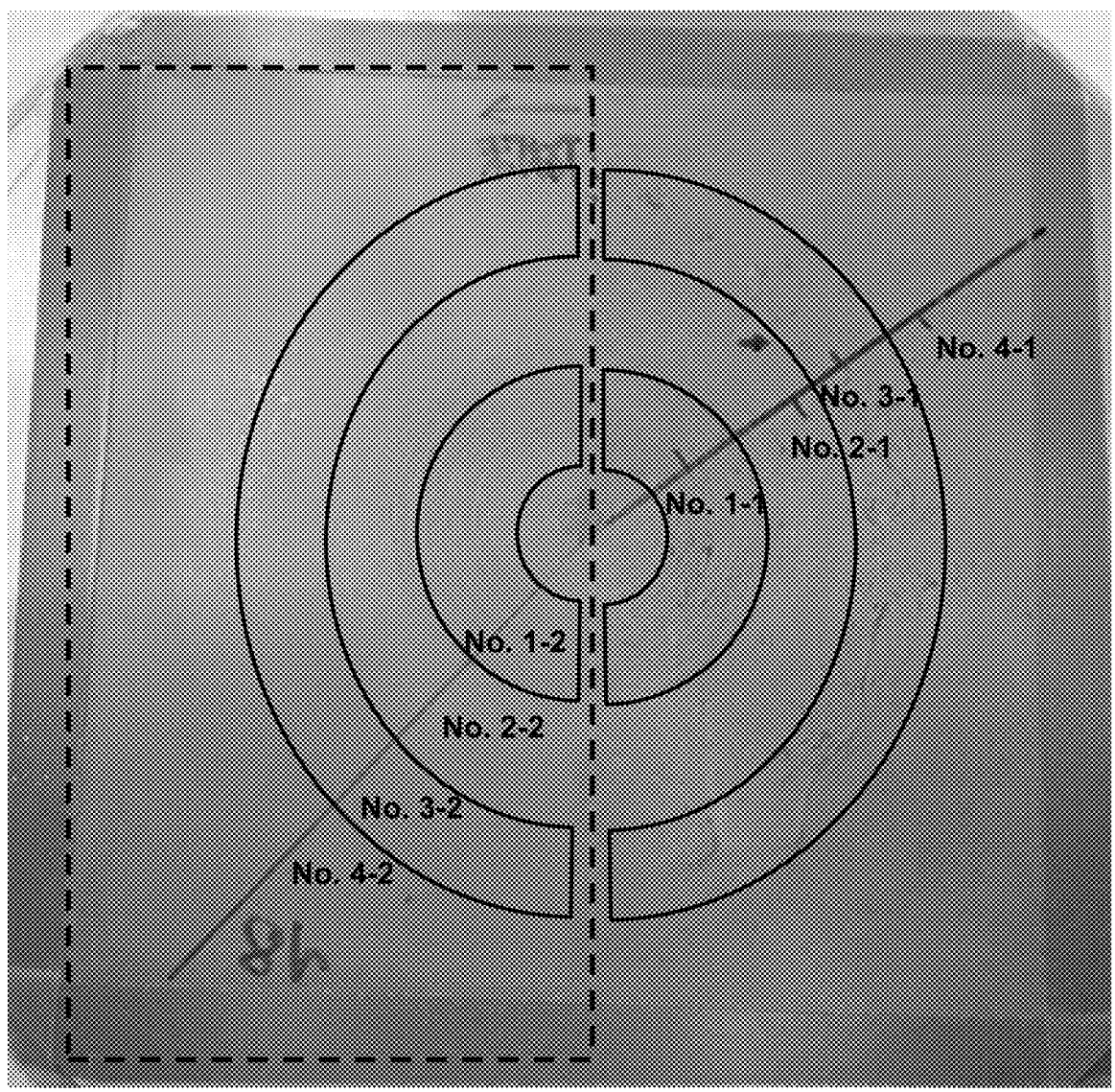
FIG. 5 is a diagram showing a ceramic coating member after 8 hours according to an embodiment of the present invention.

FIG. 5 shows a ceramic coating member after spraying with salt water for 8 hours. In FIG. 5, a portion surrounded by a dashed line indicates a portion of the ceramic coating member not sprayed with salt water. The right side of FIG. 5 shows the sprayed portion. In addition, each measurement value at each measurement position in FIG. 5 is shown in Table 1. In Table 1, Ra represents a surface roughness, Rv represents a maximum profile valley depth, Rz represents a maximum profile peak height, Rku represents a one-dimensional surface kurtosis, Rdq represents a root mean square slope, Rk represents a core roughness depth, Rpk represents a reduced peak height, and Rvk represents a reduced valley height.

TABLE 1

|  |  | Ra | Rv | Rz | Rku | Rdq | Rk | Rpk | Rvk |
| --- | --- | --- | --- | --- | --- | --- | --- | --- | --- |
| Salt water sprayed portion | No. 1-1 | 2.484 | 4.016 | 13.208 | 3.495 | 0.269 | 6.331 | 3.758 | 2.763 |
|  | No. 2-1 | 0.806 | 2.050 | 3.248 | 1.725 | 0.121 | 1.738 | 0.037 | 1.381 |
|  | No. 3-1 | 1.367 | 2.951 | 8.730 | 4.406 | 0.221 | 5.074 | 4.427 | 0.335 |
|  | No. 4-1 | 1.146 | 2.353 | 4.270 | 1.509 | 0.175 | 2.920 | 0.239 | 1.177 |
| Salt water not sprayed portion | No. 1-2 | 1.661 | 3.698 | 9.926 | 3.382 | 0.235 | 7.424 | 2.835 | 4.517 |
|  | No. 2-2 | 0.767 | 1.963 | 3.23 | 2.077 | 0.135 | 1.589 | 0.173 | 1.665 |
|  | No. 3-2 | 1.311 | 2.878 | 7.587 | 2.781 | 0.333 | 2.907 | 1.976 | 1.913 |
|  | No. 4-2 | 1.105 | 2.637 | 4.254 | 1.706 | 0.157 | 2.466 | 0.142 | 1.791 |

From the results of FIG. 5 and Table 1, a one-dimensional surface kurtosis (Rku) of the No. 1-1 portion having a surface roughness (Ra) of 2.484 was 3.495, and Rku of the No. 3-1 portion having Ra of 1.367 was 4.406. Comparing these two parts, more rust was generated in the No. 3-1 portion where Rku was large. From these results, it was clarified that the one-dimensional surface kurtosis (Rku) and a plateau structural surface parameter (Rpk) greatly influenced the density of the ceramic membrane, formation of pinholes and a rust preventive effect than the surface roughness (Ra), among indices of large convexoconcave on the surface of the metal substrate. In particular, it has been clarified that the ceramic membrane exhibits rust preventive properties in the case where the one-dimensional surface kurtosis (Rku) is 3 or less.

FIG. 6A to FIG. 8 are diagrams showing a one-dimensional cross-sectional profile and a two-dimensional cross-sectional profile with respect to a convexoconcave state of the surface of the ceramic membrane of the ceramic coating member, and a result of confirmation of the rust preventive effect by the salt water spray test. In FIG. 6A to FIG. 8, the upper left side diagram is a view in which a sample surface is observed with a laser confocal microscope, the upper right side diagram is an optical micrograph, the lower left side diagram is a two-dimensional cross-sectional profile, and the lower right side diagram is a one-dimensional cross-sectional profile.

Figure 6A:
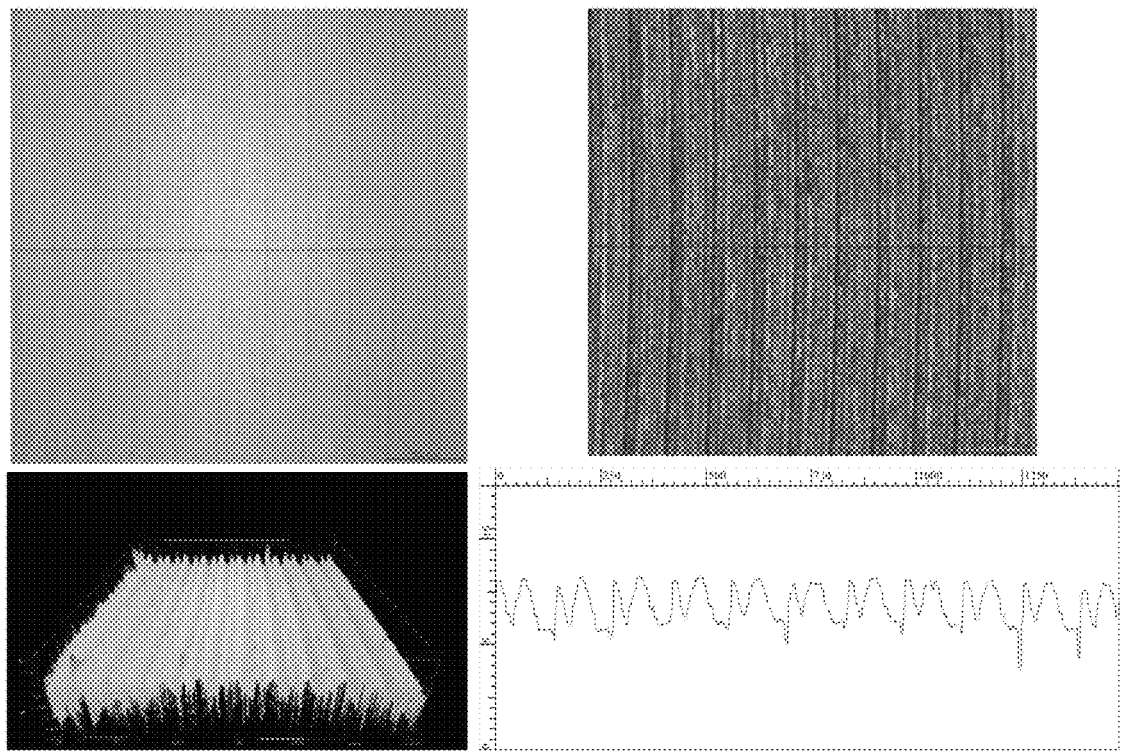
FIG. 6A is a diagram showing Ra, Rku, a one-dimensional cross-sectional profile and a two-dimensional cross-sectional profile for a state of a convexoconcave of a surface of a ceramic coating member according to an embodiment of the present invention, and a rust preventive effect by a salt water spray test.
Figure 6B:
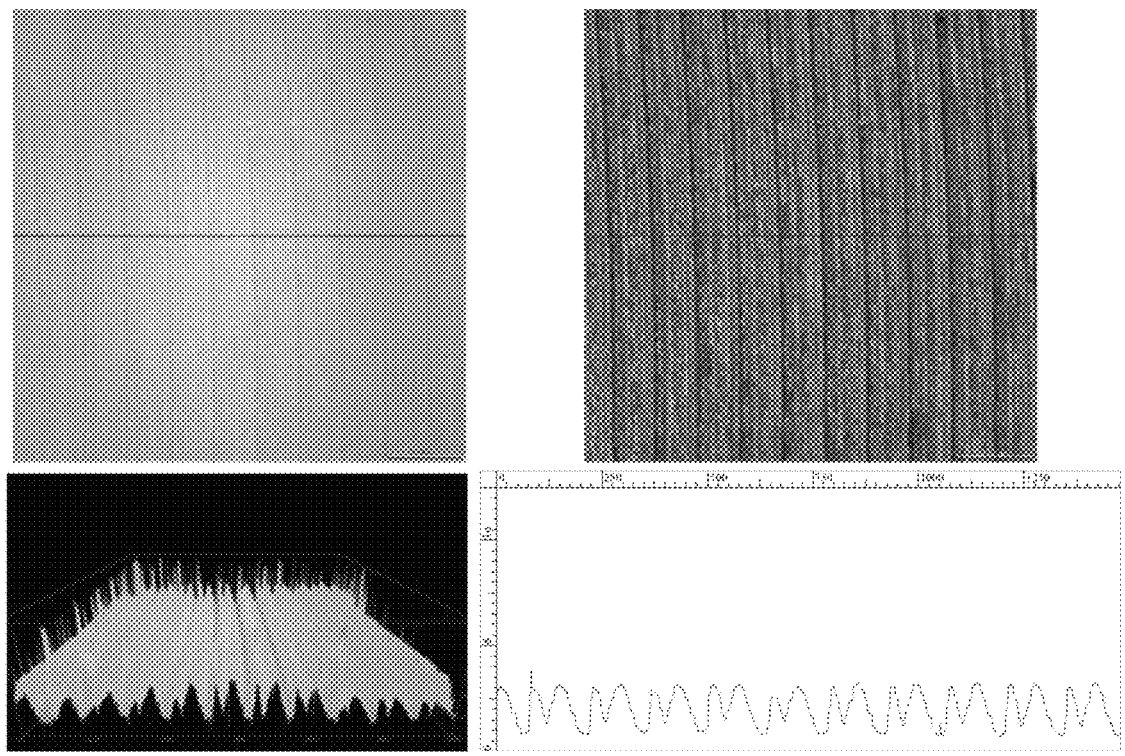
FIG. 6B is a diagram showing Ra, Rku, a one-dimensional cross-sectional profile and a two-dimensional cross-sectional profile for a state of a convexoconcave of a surface of a ceramic coating member according to an embodiment of the present invention, and a rust preventive effect by a salt water spray test.
Figure 7A:
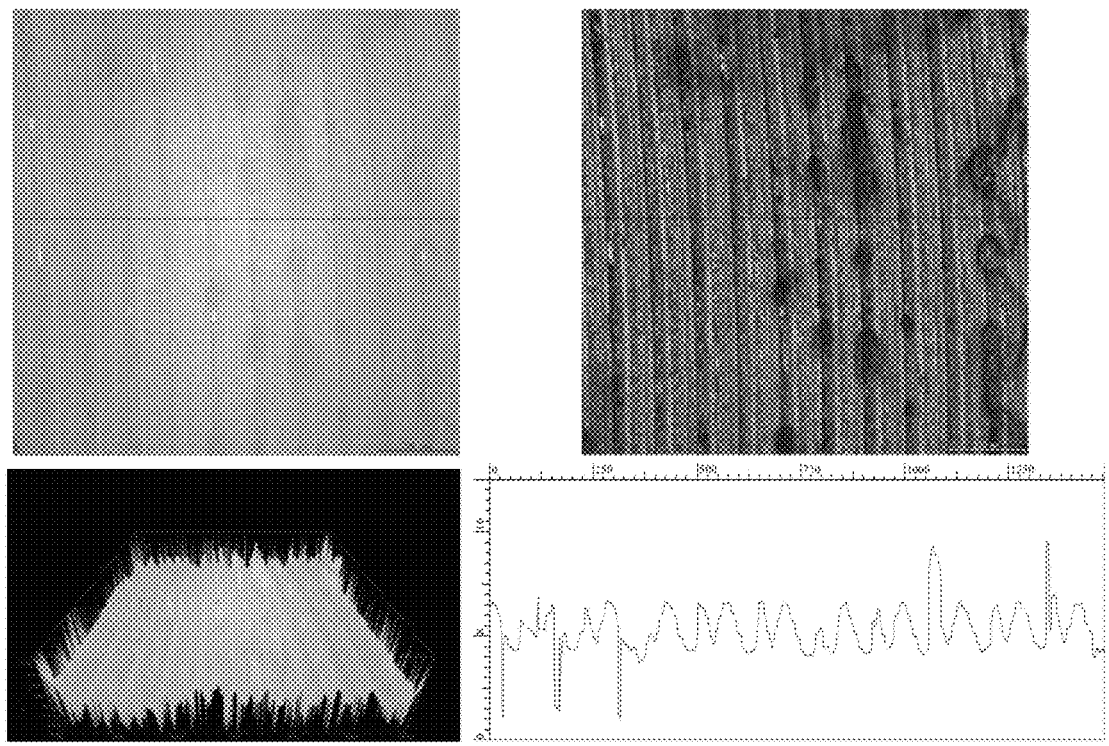
FIG. 7A is a diagram showing Ra, Rku, a one-dimensional cross-sectional profile and a two-dimensional cross-sectional profile for a state of a convexoconcave of a surface of a ceramic coating member according to an embodiment of the present invention, and a confirmatory result of a rust preventive effect by a salt water spray test.
Figure 7B:
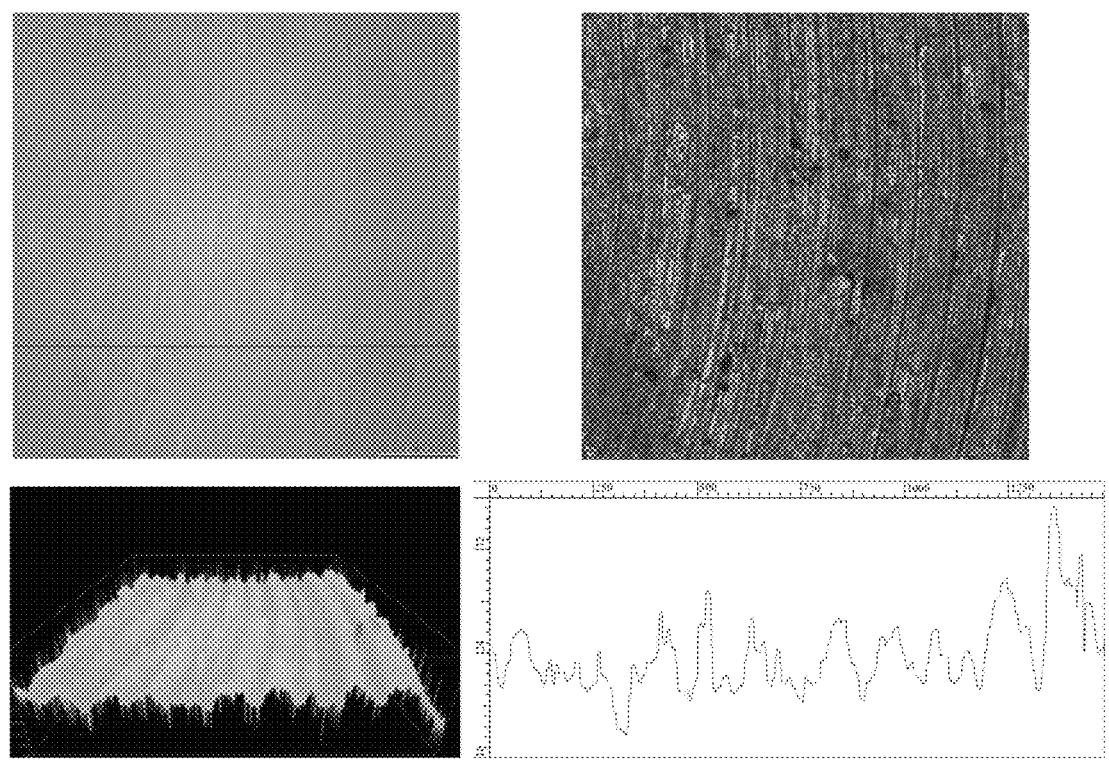
FIG. 7B is a diagram showing Ra, Rku, a one-dimensional cross-sectional profile and a two-dimensional cross-sectional profile for a state of a convexoconcave of a surface of a ceramic coating member according to an embodiment of the present invention, and a confirmatory result of a rust preventive effect by a salt water spray test.
Figure 8:
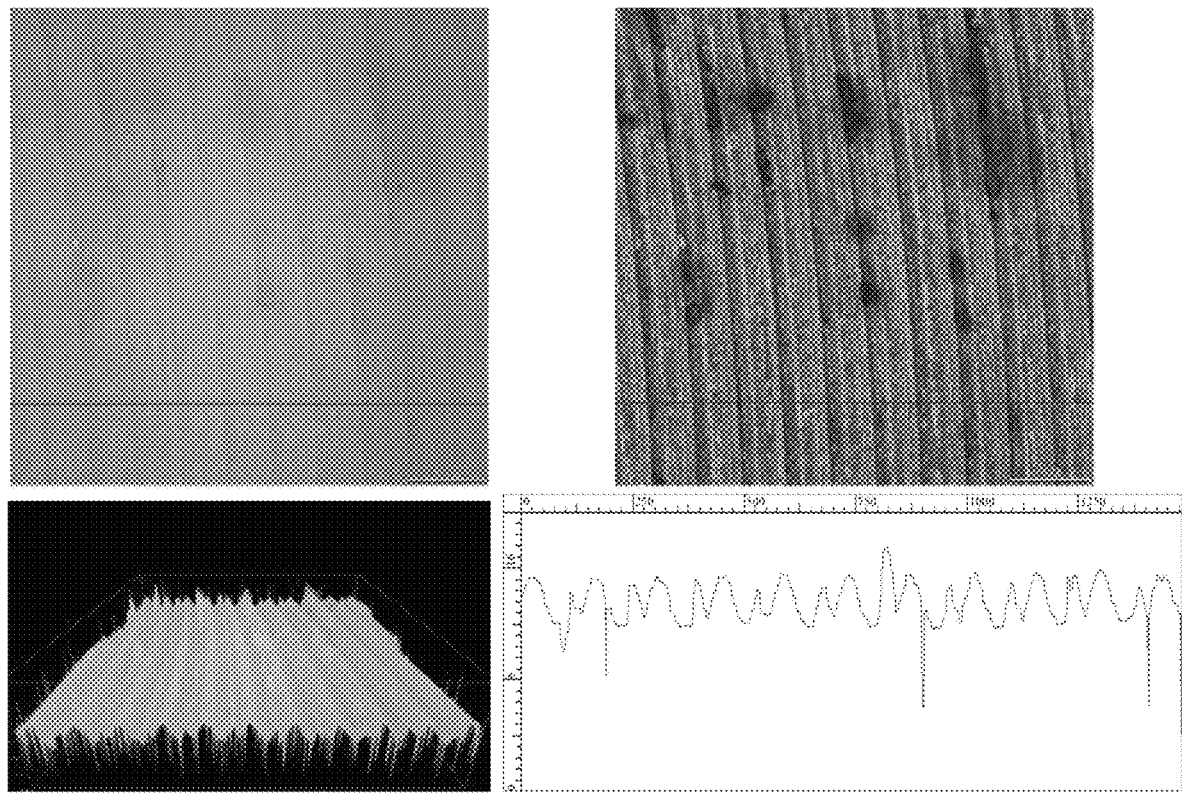
FIG. 8 is a diagram showing Ra, Rku, a one-dimensional cross-sectional profile and a two-dimensional cross-sectional profile for a state of a convexoconcave of a surface of a ceramic coating member according to an embodiment of the present invention, and a confirmatory result of a rust preventive effect by a salt water spray test.

Ra at a position where a line segment in FIG. 6A was given was 1.36, Rku was 4.09, and Rpk was 1.71. Further, Ra at a position where a line segment in FIG. 6B was given was 1.11, Rku was 1.66, and Rpk was 0.645. Ra at a position where a line segment in FIG. 7A was given was 1.36, Rku was 4.09, and Rpk was 1.71. Further, Ra at a position where a line segment in FIG. 7B was given was 1.65, Rku was 2.74, and Rpk was 2.91. Ra at a position where a line segment in FIG. 8 was given was 1.19, Rku was 5.68, and Rpk was 0.941. A surface roughness (Ra) of the ceramic membrane was about 1 μm to 1.3 μm in the respective ceramic coating members, and clear rust was observed in those with an Rku value of over 3.

Example 2

Figure 9A:
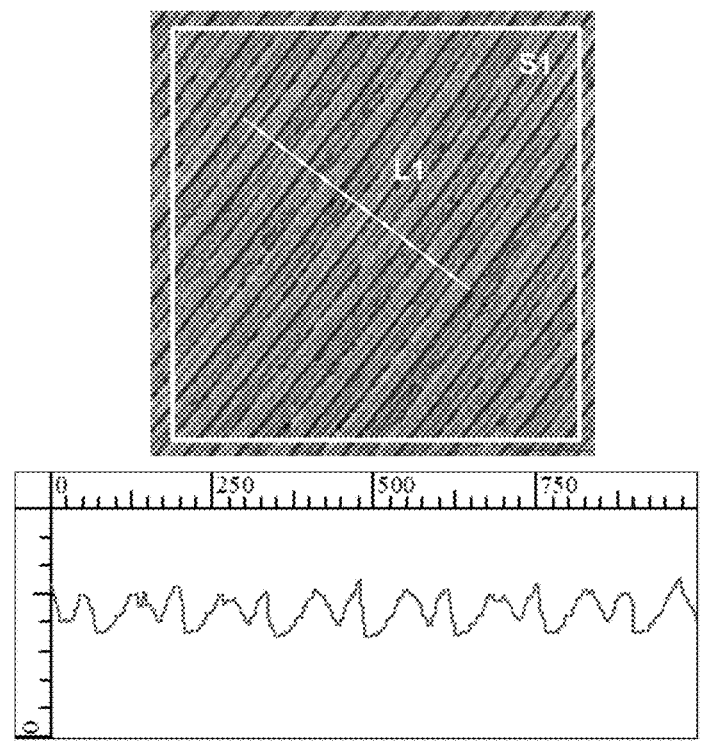
FIG. 9A shows results of a salt spray test of 12 hours on a ceramic coating member according to an embodiment of the present invention, the upper view is an optical micrograph of a portion where rust did not occur, the lower view is a one-dimensional cross-sectional profile thereof.

The rust prevention effect by the difference in the Rku value of the case where the Ra value of the surface of the ceramic membrane is at a comparable level was further examined. A 12-hour salt spray test was conducted on a ceramic coating member in which a ceramic membrane of about 4 μm was formed thereon. The upper diagram of FIG. 9A is an optical micrograph of a portion where rust did not occur in the salt spray test for 12 hours, and the lower diagram is a one-dimensional cross-sectional profile thereof. Further, the upper view of FIG. 9B is an optical micrograph of the portion where rust appears under the same conditions, and the lower view is a cross-sectional profile of the one-dimensional.

A pre-test arithmetic mean roughness (Sa) at a position (reference length (L): about 1000 μm (white line), reference area (S): about 1400 μm square (in white frame)) where a line segment in the upper diagram of FIG. 9A was given was 1.17, the maximum height (Sz) was 16.49, the two-dimensional surface kurtosis (Sku) was 2.11, the surface roughness (Ra) was 1.09, and the one-dimensional surface kurtosis (Rku) was 1.86. In addition, a pre-test Sa at the position (reference length (L): about 1000 μm (white line), reference area (S): about 1400 μm square (in white frame)) where a line segment in the upper diagram of FIG. 9B was given was 1.05, Sz was 15.34, Sku was 6.44, Ra was 1.09, and Rku was 6.26.

Figure 9B:
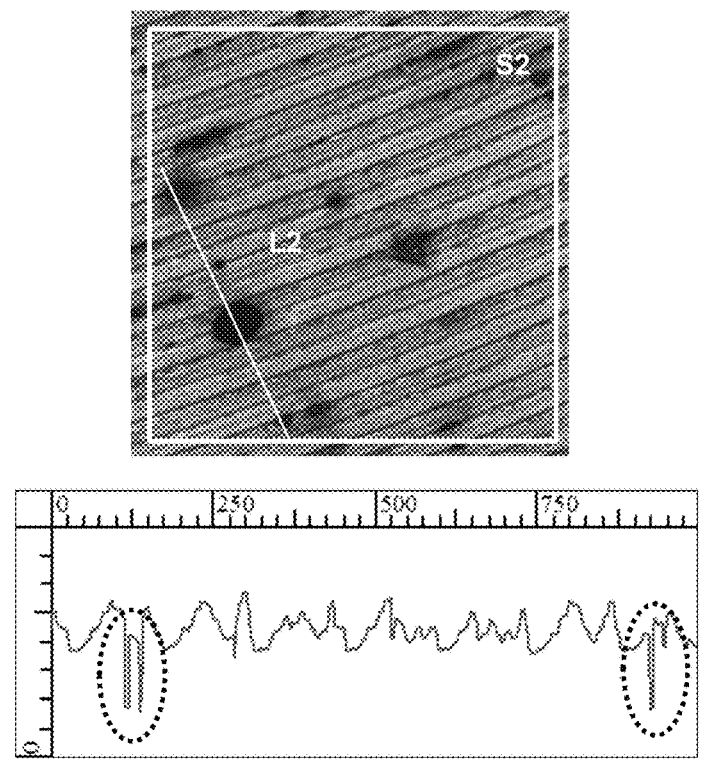
FIG. 9B shows results of a salt spray test of 12 hours on a ceramic coating member according to an embodiment of the present invention, the upper view is an optical micrograph of a portion where rust occurred, and the lower view is a one-dimensional cross-sectional profile thereof.
Figure 10A:
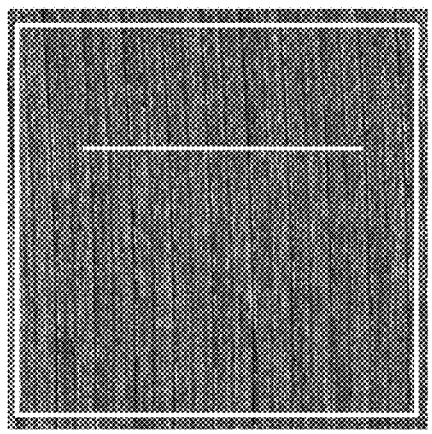
FIG. 10A is diagram showing a surface of a ceramic membrane according to an embodiment of the present invention.
Figure 10B:
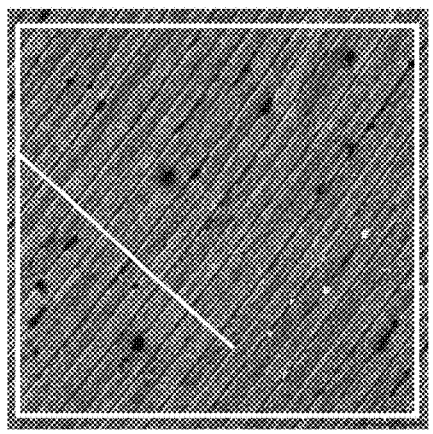
FIG. 10B is a diagram showing a surface of a ceramic membrane according to an embodiment of the present invention.
Figure 10C:
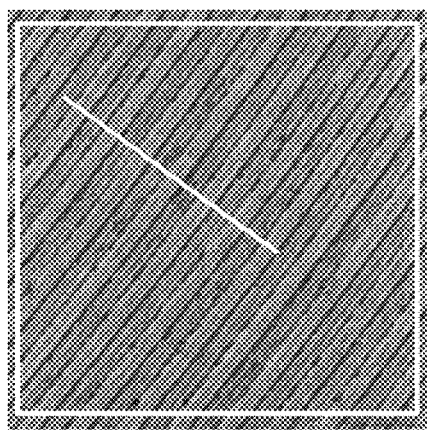
FIG. 10C is a diagram showing a surface of a ceramic membrane according to an embodiment of the present invention.
Figure 10D:
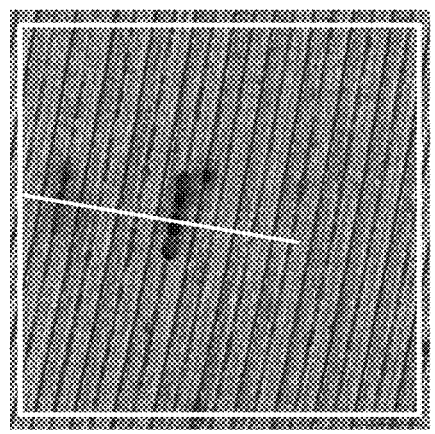
FIG. 10D is a diagram showing a surface of a ceramic membrane according to an embodiment of the present invention.
Figure 10E:
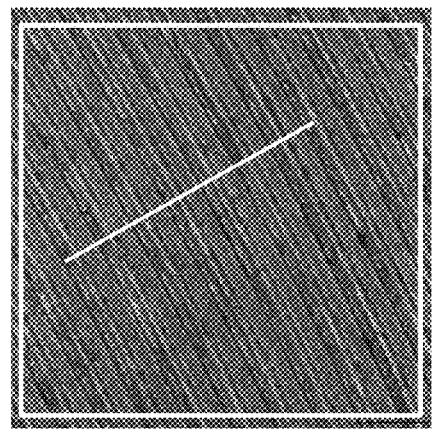
FIG. 10E is a diagram showing a surface of a ceramic membrane according to an embodiment of the present invention.
Figure 10F:
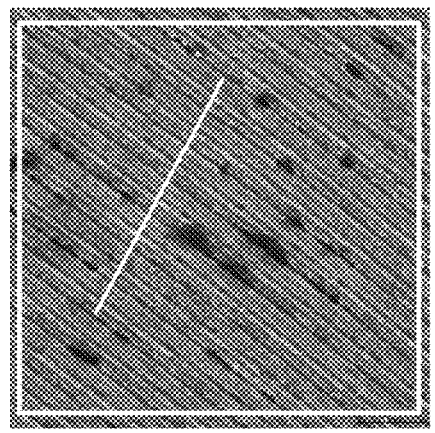
FIG. 10F is a diagram showing a surface of a ceramic membrane according to an embodiment of the present invention.

A measurement line L1 (reference length (L)) of FIG. 9A and a measurement line L2 (reference length (L)) of FIG. 9B both have an Ra value of around 1 μm before the salt spray test, whereas the measurement line L1 has an Rku value of 1.86 before the salt spray test, and the measurement line L2 has a Rku of 6.26 which greatly differs from the measurement line L1. This is the same for the two-dimensional Sku measured in the viewing area of the photograph. This is due to a presence of sharp valleys (circled part) found in the cross-sectional profile of the measuring line L2. That is, in the ceramic deposition by the aerosol deposition method, it has been clarified that it is more important to reduce a degree of sharpness of the convexoconcave than a depth of convexoconcave of the metal substrate in order to realize an excellent coating without pinholes.

Example 3

Regarding the surface of the ceramic membrane of the ceramic coating member shown in FIGS. 10A to 10F, the two-dimensional surface kurtosis (Sku) of the three types of ceramic coating members whose thickness of the ceramic membrane is 0.9 μm (FIG. 10A and FIG. 10B), 4 μm (FIG. 10C and FIG. 10D), and 6 μm (FIG. 10E and FIG. 10F), respectively, was measured using the confocal microscope, and the relation with the generation status of rust after salt water spraying was investigated. Incidentally, the 12-hour salt spray test was performed on the ceramic coating member whose thickness is 0.9 μm and 4 μm, and an 8-hour salt spray test was performed on the ceramic coating member whose thickness is 6 μm.

In a ceramic coating member having the ceramic membrane whose thickness was 0.9 μm (FIG. 10A), Sa was 1.20, Sz was 12.0, Sku was 1.80, Ra was 1.22, and Rku was 1.75 with respect to the reference length (L): about 1000 μm (white line), the reference area (S): about 1400 μm square (in white frame). In FIG. ft Sa was 1.20, Sz was 13.0, Sku was 1.83, Ra was 1.21, and Rku was 1.82 with respect to the reference length (L): about 1000 μm (white line), and the reference area (S): about 1400 μm square (in white frame). In a ceramic coating member having the ceramic membrane whose thickness is 4 μm (FIG. 10C), Sa is 1.16, Sz is 14.7, Sku is 2.98, Ra is 1.21, and Rku is 2.65 with respect to the reference length (L): about 1000 μm (white line), the reference area (S): about 1400 μm square (in a white frame). Further, in FIG. 10D, Sa is 1.10, Sz is 13.63, Sku is 3.06, Ra is 1.11, Rku is 4.14 with respect to the reference length (L): about 1000 μm (white line), the reference area (S): about 1400 μm square (in white frame). In a ceramic coating member having the ceramic membrane whose thickness is 6 μm (FIG. 10E), Sa is 1.27, Sz is 16.2, Sku is 2.98, Ra is 1.46, and Rku is 2.96 with respect to the reference length (L): about 1000 μm (white line), the reference area (S): about 1400 μm square (in a white frame). Further, in FIG. 10F, Sa is 1.33, Sz is 21.6, Sku is 3.23, Ra is 1.28, Rku is 3.11 with respect to the reference length (L): about 1000 μm (white line), the reference area (S): about 1400 μm square (in white frame).

No rust was observed in the surface observations after 8 to 12 hours of the salt spray test in the case where the membrane thickness of the ceramic membrane was 4 μm and 6 μm and the two-dimensional surface kurtosis (Sku) within the measured area of the ceramic coating member was 3 or less. On the other hand, in the ceramic coating member having a ceramic membrane thickness of 0.9 μm, in the case where the two-dimensional surface kurtosis (Sku) was 1.83, rust was observed after the 12-hour salt water spray test, although it was small and slight compared to the ceramic coating members with a ceramic membrane thickness of 4 μm and 6 μm. On the other hand, no rust is observed after a salt spray test for 12 hours in a ceramic coating member having a two-dimensional surface kurtosis (Sku) of 1.80 or less, and a two-dimensional surface kurtosis (Sku) for providing good rust prevention is reduced from 2 to 1.80 as compared with a ceramic coating member having a ceramic membrane thickness of 4 μm and 6 μm. From these results, it was clarified that the membrane thickness of the ceramic membrane, which is excellent in mass productivity and can be used industrially, is preferably 1 μm or more, and the two-dimensional surface kurtosis (Sku) needs to be 3 or less. It has also been found that it is more preferable that the two-dimensional Sku be 2 or less.

In the aerosol deposition method, it is also disclosed in Patent Literatures 2 and 3 that a membrane with higher hardness can be formed in the case where a substrate has a mirror surface with a small surface roughness (Ra). However, the deposition mechanism and the process factor for eliminating the pinhole to a sufficient degree to ensure a sufficient rust preventive effect were not clear even if the surface of the substrate is rough. For example, Patent Literatures 2 and 3 disclose that Ra<0.5 μm is required in order to obtain adequate ceramic membrane densities and hardness. On the other hand, it has been found that even if Ra is μm or more, and if the Rku value, the Sku value, and the Rpk value satisfy the above conditions, an adequate rust prevention effect and membrane hardness can be ensured from the examples of the present invention described above.

Example 4

Figure 11A:
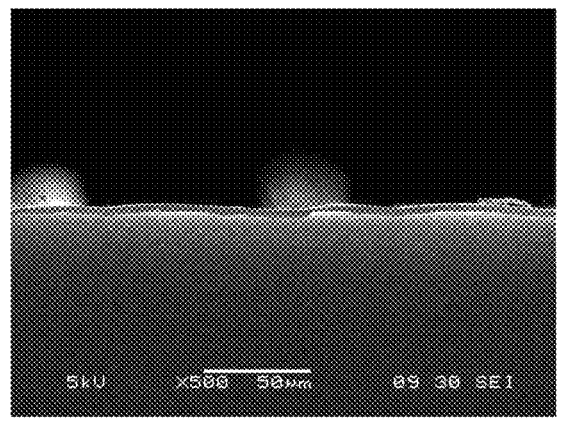
FIG. 11A shows a cross-sectional SEM photograph of a ceramic coating member in which no rust occurred and Rku is 2 or less.
Figure 11B:
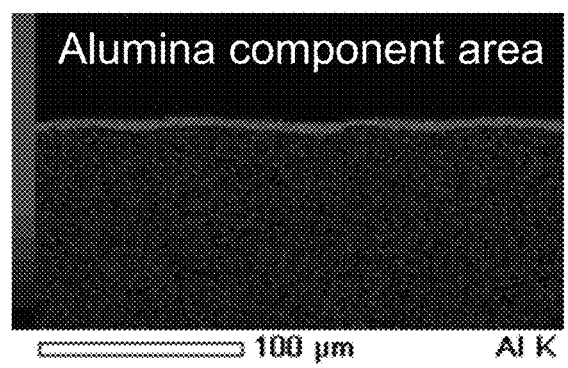
FIG. 11B is an elemental analytical mapping of aluminum for the ceramic coating member.
Figure 11C:
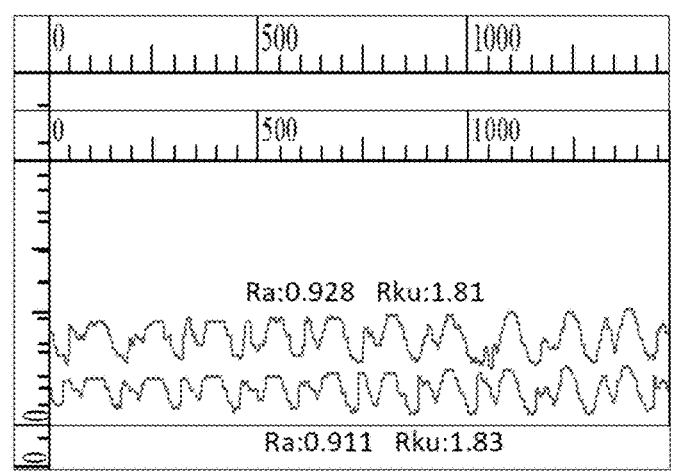
FIG. 11C shows a cross-sectional profile of the ceramic coating member observed with a confocal microscope.
Figure 12A:
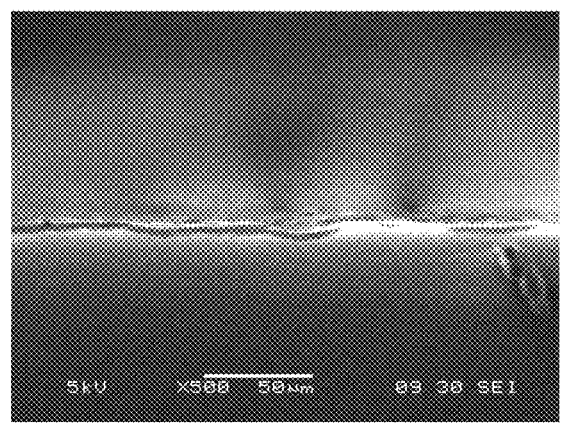
FIG. 12A shows a cross-sectional SEM photograph of a ceramic coating member in which rust occurred and Rku is 5 or more.
Figure 12B:
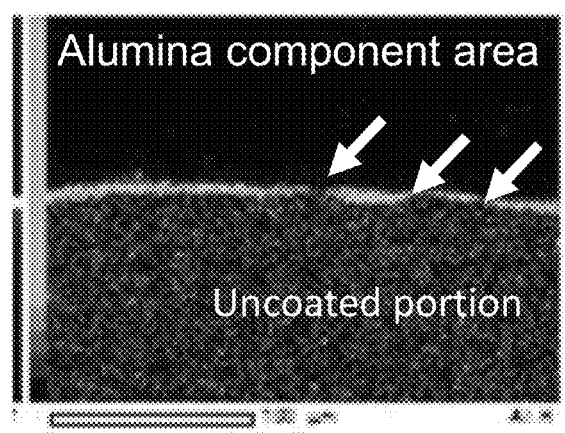
FIG. 12B is an elemental analytical mapping of aluminum for the ceramic coating member.
Figure 12C:
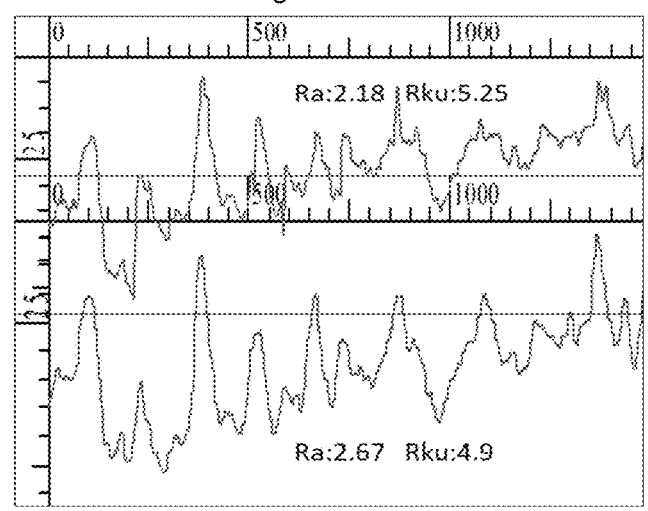
FIG. 12C shows a cross-sectional profile of the ceramic coating member observed with a confocal microscope.

FIGS. 11A to 11C and FIGS. 12A to 12C are diagrams showing the results of a 7-hour salt spray test on a ceramic coating member coated with an alumina membrane having a thickness of 3 μm on an iron substrate. FIG. 11A shows a cross-sectional SEM photograph of a ceramic coating member with an Rku value of 2 or less that did not rust, FIG. 11B is an elemental analytical mapping of aluminum for the ceramic coating member, and FIG. 11C shows a cross-sectional profile of the ceramic coating member observed with the confocal microscope. Further, FIG. 12A shows a cross-sectional SEM photograph of a ceramic coating member of an Rku value of 5 or more that rusts, FIG. 12B is an elemental analytical mapping of aluminum for the ceramic coating member, and FIG. 12C shows a cross-sectional profile of the ceramic coating member observed by the confocal microscopy.

In the elemental analysis mapping of aluminum (FIG. 11B and FIG. 12B), an area where the element of aluminum appears densely represents the area where the alumina membrane is coated. In the cross section of the Ra value=2.18 and Rku>5 or more where rust was observed in the salt spray test shown in FIG. 12B, it can be confirmed that convex portions of the convexoconcave of the iron substrate are sharp at three locations indicated by arrows. This result indicated that the coating of alumina was interrupted and the iron substrate was exposed, and it was confirmed that rust was generated from this place. On the other hand, in the cross section of ceramic coating member of Ra=0.92 and Rku<2 or less shown in FIG. 10B, it can be observed that the alumina membrane coats the convexoconcave of the iron base material with a substantially constant thickness, and there was no occurrence of rust in the salt spray test for 7 hours. Therefore, it was clarified that not only the depth but also the sharpness of the convexoconcave of the substrate greatly influenced a coating ability of the alumina membrane covering it in the ceramic deposition by the aerosol deposition method.

Example 5

Figure 13A:
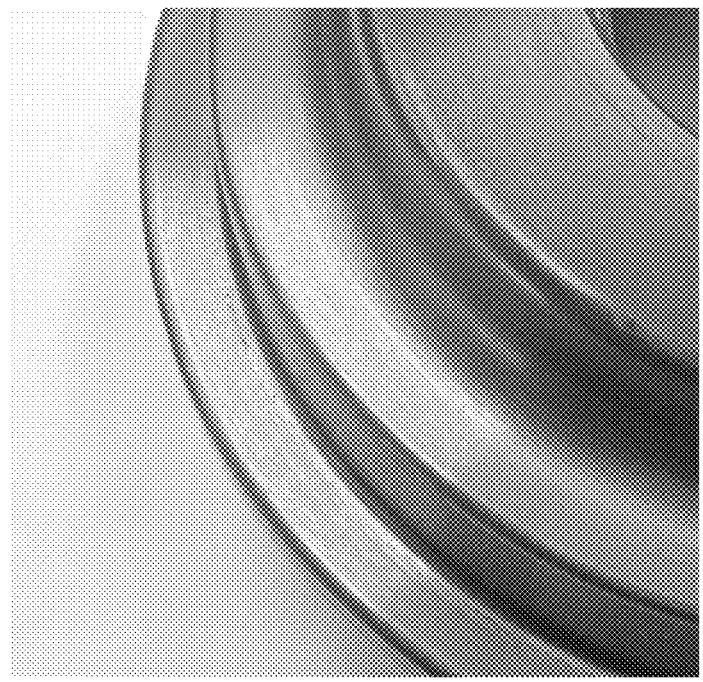
FIG. 13A shows a structure in which an alumina membrane is coated on a surface of a complex three-dimensional shape by an aerosol deposition method.
Figure 13B:
FIG. 13B shows a structure in which an alumina membrane is coated on a surface of a complex three-dimensional shape by an aerosol deposition method.
Figure 14A:
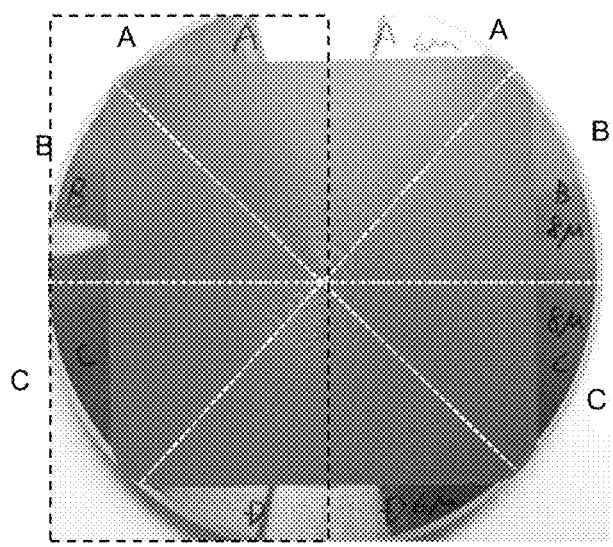
FIG. 14A shows a ceramic coating member in which an alumina membrane is formed as a ceramic membrane having a thickness (t) of 6 μm or 8 μm on an iron base substrate.
Figure 14B:
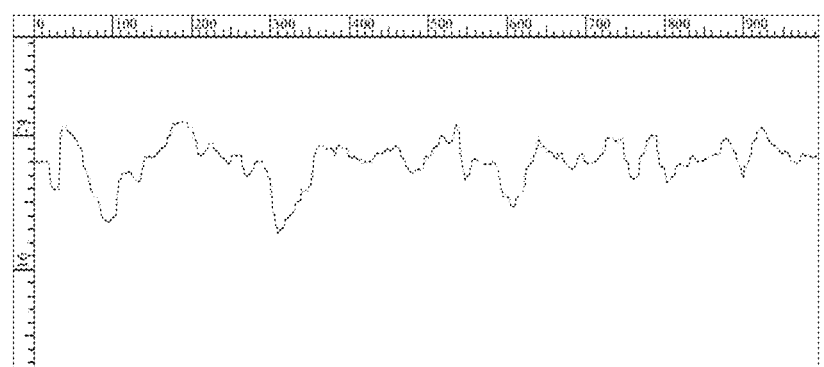
FIG. 14B shows a ceramic coating member in which an alumina membrane is formed as a ceramic membrane having a thickness (t) of 6 μm or 8 μm on an iron base substrate.
Figure 14C:
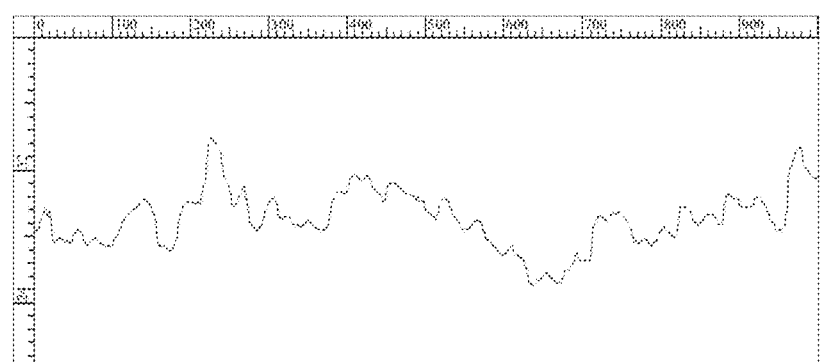
FIG. 14C shows a ceramic coating member in which an alumina membrane is formed as a ceramic membrane having a thickness (t) of 6 μm or 8 μm on an iron base substrate.
Figure 14D:
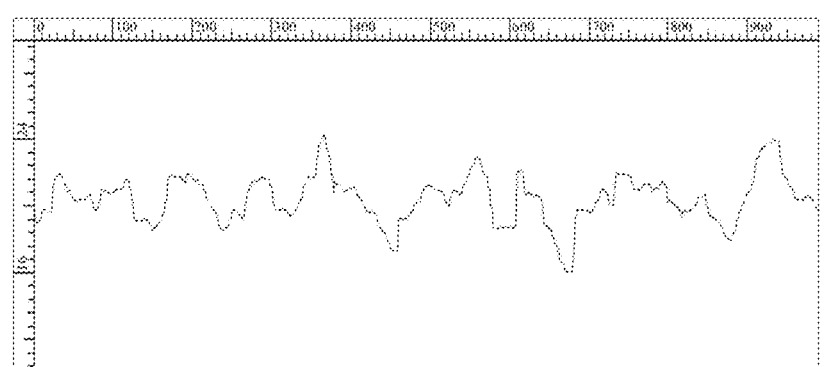
FIG. 14D shows a ceramic coating member in which an alumina membrane is formed as a ceramic membrane having a thickness (t) of 6 μm or 8 μm on an iron base substrate.

FIGS. 13A and B are examples in which an alumina membrane (ceramic membrane) was coated on a surface of a structure (metal substrate) having a complicated three-dimensional shape by the aerosol deposition method. Although a surface roughness Ra of the structure of FIG. 13A is 1.5 μm, a surface roughness Ra of the structure of FIG. 13B is 1.1 μm, both are about 1 μm in the surface roughness Ra, the structure of FIG. 13A has an Rku value of 3 or less, and the structure of FIG. 13B has an Rku value of 3 or more. These structures were subjected to the salt spray test described above for 12 hours. As a result, although rust was not generated on the surface in the structure of FIG. 13A having an Rku value of 3 or less, rust was observed in many places in the structure of FIG. 13B having an Rku value of 3 or more. In such a complex three-dimensional structure, it is not easy to uniformly machine and polish the surface roughness Ra into a mirror surface of 0.5 μm or less. Therefore, insufficient scraping or insufficient polishing is always generated in a corner portion or the like, pinholes or cracks occur and rust occurs on the ceramic membrane coated at that location. On the other hand, even if Ra is 1 μm or more, if machining is performed so that Rku is 3 or less, the ceramic coating that does not cause rust can be performed, and productivity can be improved and the processing cost can be reduced by finishing the substrate that focuses on the Rku value.

Example 6

Figure 15:
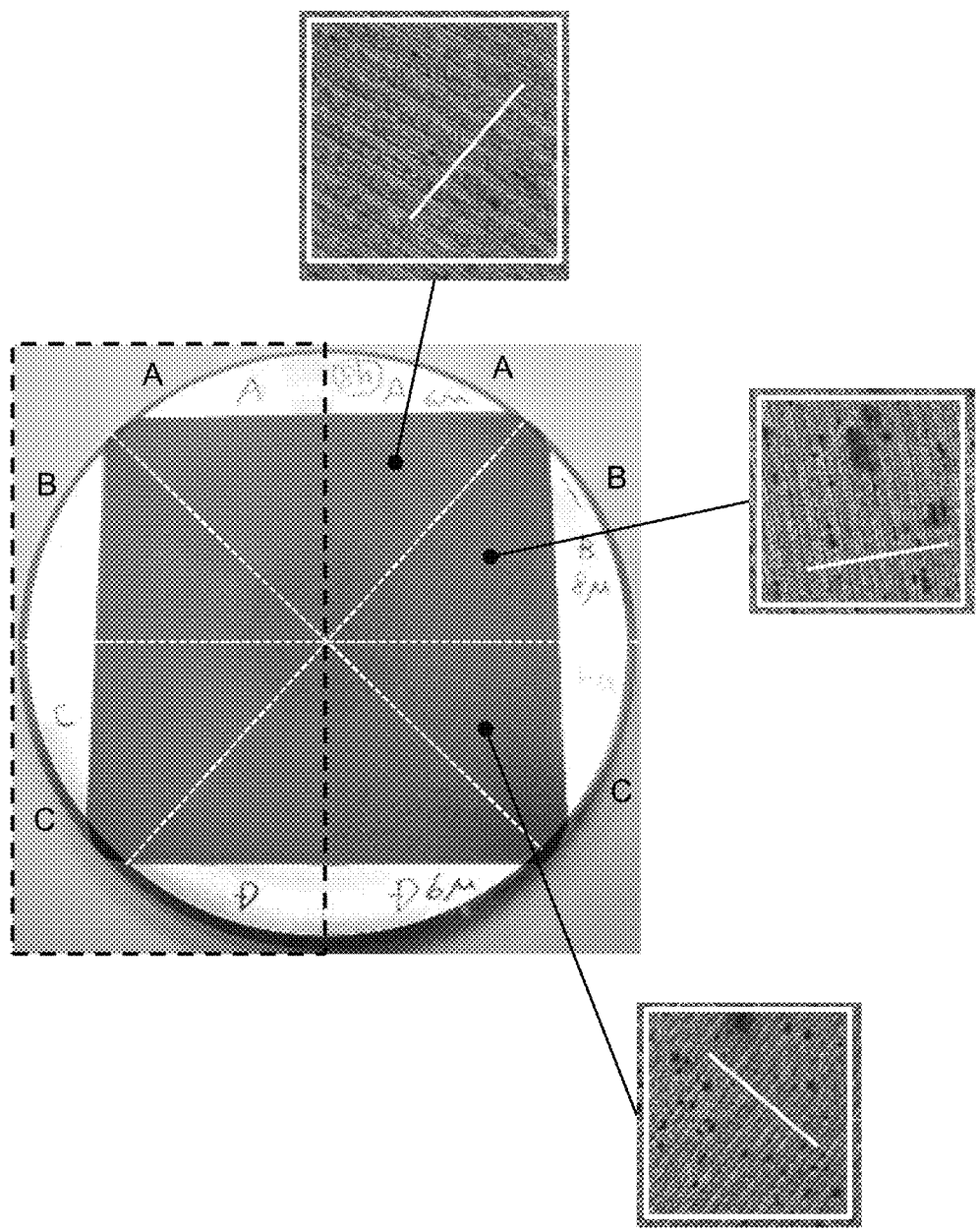
FIG. 15 shows results of comparing a rust prevention effect of the case where a salt spray test is performed for 8 hours with respect to the ceramic coating member.

FIGS. 14A to 14D are diagrams showing a ceramic coating member in which an alumina membrane is formed as a ceramic membrane having a membrane thickness (t) of 6 μm or 8 μm on an iron base substrate. FIG. 15 is a diagram showing a result of comparing the rust preventive effect of the ceramic coating member when the salt water spray test described above was performed for 8 hours. The area surrounded by the dashed line on the left side of each figure indicates an area where the salt spray test is not performed.

The surface roughness (Ra) at a reference length (L) of about 1000 μm perpendicular to a lathe surface of an area A coated with an alumina membrane having a thickness of 6 μm was 0.89, the one-dimensional surface kurtosis (Rku) was 4.28, the arithmetic mean roughness (Sa) was 1.07, the maximum height (Sz) was 17.7, and the two-dimensional surface kurtosis (Sku) was 4.24. Ra of an area B coated with an alumina membrane having a thickness of 8 μm was 1.14, Rku was 3.20, Sa was 1.38, Sz was 16.2, and Sku was 2.93. Furthermore, Ra of an area C coated with an alumina membrane having a thickness of 8 μm was 1.14, Rku was 3.33, Sa was 1.00, Sz was 14.4, and Sku was 3.33.

Although all of the area A, B, and C has a condition that rust occurs and the one-dimensional surface kurtosis (Rku) and the two-dimensional surface kurtosis (Sku) exceed approximately 3, the size and frequency of rust were large in the areas B and C coated with the alumina membrane having the thickness of 8 μm, whereas the size and frequency of rust clearly decreased in the area A coated with the alumina membrane having the thickness of 6 μm. As the thickness of the ceramic membrane increases, an internal stress of the ceramic membrane increases. Further, in a rough surface of an Rku value and the Sku value being 3 or more, adhesion between the ceramic membrane and the substrate is also reduced. Therefore, it is considered that fine peeling and cracks are easily generated in the ceramic membrane, and rust is generated therefrom. From the above, it was clarified that an optimum membrane thickness (t) range of the ceramic membrane to sufficiently obtain the rust preventive effect at an industrial mass production level is 1 μm<t<10 μm, preferably 1 μm<t<6 μm.

Reference Example 1

It was verified that the ceramic membrane according to the embodiment described above can suppress the spread of rust from the pinhole than the conventional hard chromium plating membrane even if there is a pinhole in the ceramic membrane. As Reference Example 1, an alumina membrane was formed on an iron base substrate, and a ceramic coating member in which pinholes were present was used. Specifically, an iron base metal substrate (SPCC, Vickers hardness: 150 Hv to 200 Hv) having a surface roughness (Ra) of 2 μm to 3 μm and α-alumina (Vickers hardness: 1000 Hv to 2000 Hv) having a particle size distribution of 0.1 μm to 10 μm were prepared. Using the prepared metal substrate and the α-alumina particles, an alumina membrane was formed on the metal substrate by the aerosol deposition method. As deposition conditions, a ceramic coating member having an alumina membrane having a membrane thickness of about 3 μm was formed by setting a vacuum degree: 100 Pa to 500 Pa, a carrier gas: air, and a carrier gas flow rate: 10 L/minute to 40 L/minute. In a ceramic coating member of Reference Example 1, a one-dimensional surface Kurtosis (Rku) of an alumina membrane was 3.5, a two-dimensional surface Kurtosis (Sku) was 4.6, a one-dimensional interface Kurtosis (Rkub) of a convexoconcave formed at an interface between the alumina membrane and an iron base substrate was 2.6, and it was confirmed that the ceramic coating member where pinholes are generated slightly deviates from the values such as the one-dimensional surface Kurtosis of the ceramic coating member of the present example.

Comparative Example 1

As Comparative Example 1, a conventional hard chromium plating membrane was formed on the iron base substrate used in Reference Example 1. Specifically, a hard chromium plating coating member of Comparative Example 1 having a hard chromium plating membrane having a membrane thickness of about 500 µm was formed on the iron base substrate used in Reference Example 1.

The coating members of Reference Example 1 and Comparative Example 1 were subjected to an evaluation of rust prevention of the coating members of Reference Example 1 and Comparative Example 1 under the same conditions as in Example 1 in accordance with the salt spray test (JIS Z 2371: 2015).

Figure 16:
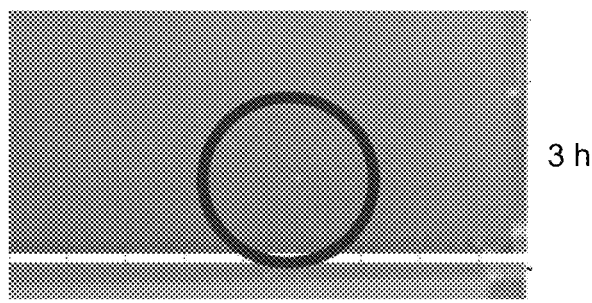
FIG. 16 is a top view of a ceramic coating member of a Reference Example 1 after spraying salt water for 3 hours, 7 hours, and 24 hours.
Figure 16:
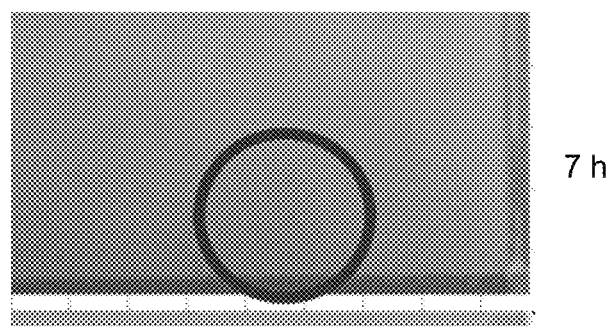
Figure 16:
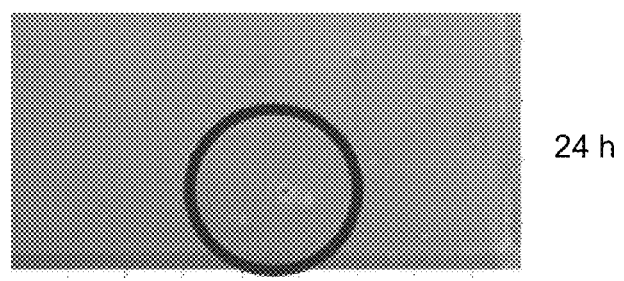
Figure 17:
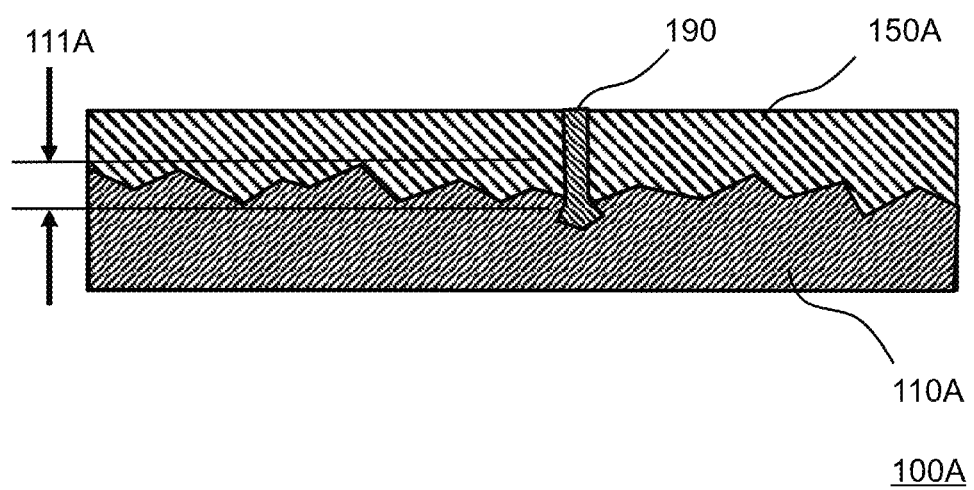
FIG. 17 is a schematic diagram for explaining a spread of rust in the ceramic coating member of the Reference Example 1.

FIG. 16 shows a top view of the ceramic coating member of Reference Example 1 after spraying salt water for 3 hours, 7 hours, and 24 hours for the ceramic coating member of Reference Example 1. In FIG. 16, a portion surrounded by a circle indicates a portion in which rust is generated in the pinhole. FIG. 17 is a schematic diagram for explaining a spread of rust in the ceramic coating member of Reference Example 1. In a ceramic coating member 100A of Reference Example 1, the rust generated from an iron base substrate 110A in a pinhole 190 did not spread in a lateral direction (a direction parallel to the iron base substrate 110A) in an alumina membrane 150A. In the alumina membrane 150A of Reference Example 1 formed by the aerosol deposition method, since there is an anchoring layer 111A at an interface of the iron base substrate 110A, a lateral spread of rust at the interface is suppressed, a spread of rust from the pinhole 190 is greatly suppressed.

Figure 18A:
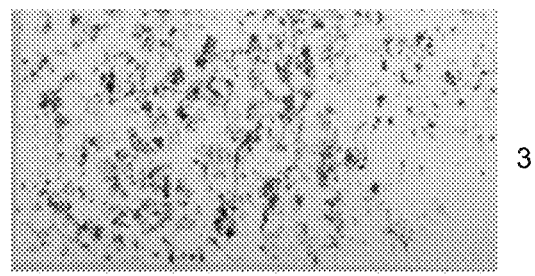
FIG. 18A shows a top view of a hard chrome plated coating member of a Comparative Example 1 after spraying the salt water for 3 hours and 7 hours.
Figure 18A:
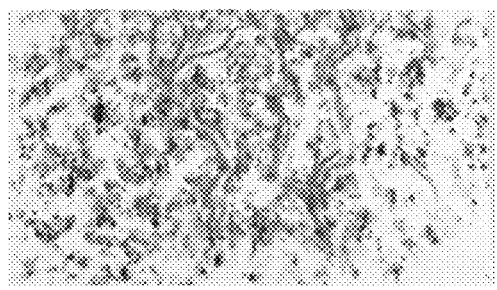
Figure 18B:
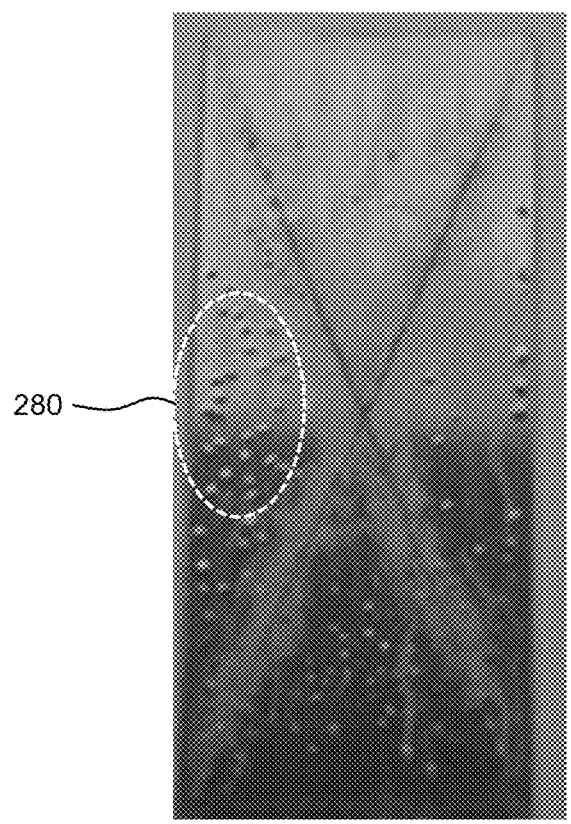
FIG. 18B shows a float of a hard chrome plated membrane due to a development of rust at an interface between the hard chrome plated membrane and an iron base substrate.
Figure 19:
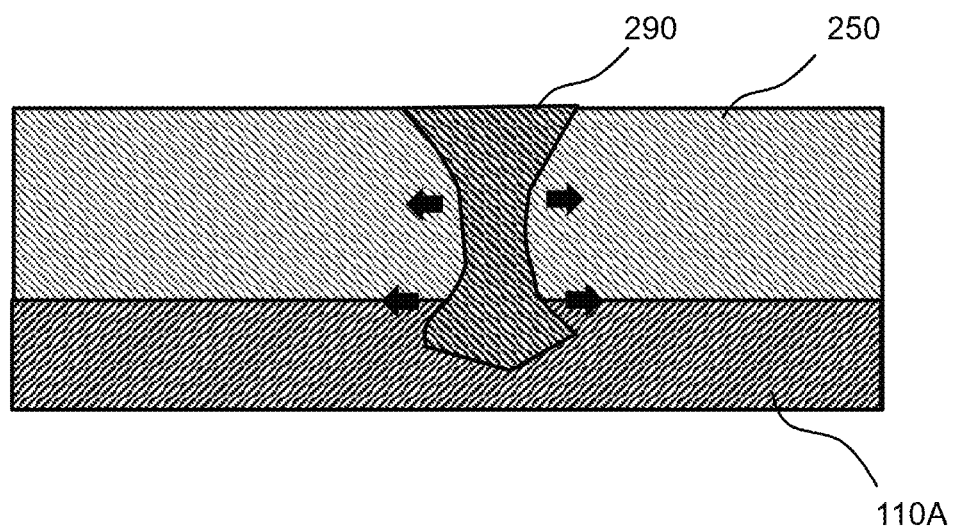
FIG. 19 is a schematic diagram for explaining a spread of rust in the hard chrome plated coating member of the Comparative Example 1.

FIG. 18A shows a top view of the hard chromium plating coating member of Comparative Example 1 after spraying salt water for 3 hours and 7 hours, and FIG. 18B shows a float of the hard chromium plating membrane due to a development of rust at an interface between the hard chromium plating membrane and the iron base substrate. FIG. 19 is a diagram for explaining the spread of rust in the hard chrome plating coating member of Comparative Example 1. In a hard chromium plating coating member 200 of Comparative Example 1, a hard chromium plating membrane 250 itself also gradually rusted, and the rust largely spread in the lateral direction around a pinhole 290. Also, an interface between the hard chromium plating membrane 250 and the iron base substrate 110A is also laterally eroded, and an event that the chromium hard plating membrane 250 peels off from the iron base substrate 110A and partially floats also occurs (FIG. 18B).

From the results of Comparative Example 1, it was clarified that, since an interface between a hard chromium plating layer and an iron base substrate is smooth in the conventional hard chromium plating membrane, rust easily spreads along the interface. On the other hand, in the ceramic coating member 100A of Reference Example 1, it was found that even if the pinhole 190 is present in the alumina membrane 150A, since there is the anchoring layer 111A at the interface between the alumina membrane 150A and the iron base substrate 110A, the lateral spread of rust at the interface is suppressed, and the spread of rust from the pinhole 190 is greatly suppressed. Although the ceramic coating member of the embodiment described above suppresses pinhole generation, from the results of Reference Example 1, it is clear that even if pinholes occur in the ceramic coating member of the embodiment, since there is an anchor layer at the interface between the alumina membrane and the metal substrate, the spread of rust from the pinhole can be significantly suppressed.

According to an embodiment of the present invention, a ceramic coating member having excellent rust prevention performance is provided.

INDUSTRIAL APPLICABILITY

The ceramic coating member according to the present invention can be suitably used as an antirust coating member and an abrasion-resistant member which are substitutes for hexavalent chromium functional plating members, which have been environmental problems in the industry.

What is claimed is:

1. A ceramic coating member comprising: a ceramic membrane arranged with a plurality of ceramic fine particles on a metal substrate; and an anchoring layer having a convexoconcave at an interface of the metal substrate with the ceramic membrane, wherein one-dimensional surface kurtosis (Rku) of the ceramic membrane is 3 or less, or two-dimensional surface kurtosis (Sku) is 3 or less, or 1<(Rkub·Hvp)/Hvs<6, in a case where one-dimensional interface kurtosis of the convexoconcave formed at the interface of the metal substrate with the ceramic membrane is defined as Rkub, a hardness of the metal substrate is defined as Hvs, and a hardness of ceramic particles is defined as Hvp, and wherein the plurality of ceramic fine particles are fine particles in which a ceramic particle material is refined, and a relationship of 2.5<HvC/HvS<10 is provided between a Vickers hardness (HvC) of the ceramic particle material and a Vickers hardness (HvS) of the metal substrate".

2. The ceramic coating member according to claim 1, wherein a thickness of the ceramic membrane is 1 µm or more and 10 µm or less.

3. The ceramic coating member according to claim 2, wherein the ceramic coating member is an antirust coating member.

4. The ceramic coating member according to claim 1, wherein the ceramic coating member is an antirust coating member.

* * * * *